United States Patent
Tsutsui et al.

[11] Patent Number: 5,842,950
[45] Date of Patent: Dec. 1, 1998

[54] CONTROL APPARATUS FOR AUTOMATIC TRANSMISSIONS

[75] Inventors: Hiroshii Tsutsui; Kazumasa Tsukamoto; Masahiro Hayabuchi; Takayuki Hisano, all of Anjo, Japan

[73] Assignee: Aisin Aw Co., Ltd., Anjo, Japan

[21] Appl. No.: 771,141

[22] Filed: Dec. 20, 1996

[30] Foreign Application Priority Data

Jun. 19, 1996 [JP] Japan .................................... 8-177167

[51] Int. Cl.$^6$ .................................................. F16H 61/08
[52] U.S. Cl. .......................... 477/143; 477/156; 477/158; 477/116; 477/117
[58] Field of Search .................................... 477/143, 156, 477/158, 116, 117, 159, 162, 160

[56] References Cited

U.S. PATENT DOCUMENTS

| | | | |
|---|---|---|---|
| 5,086,668 | 2/1992 | Fujiwara et al. | 477/159 X |
| 5,368,531 | 11/1994 | Ando et al. | 477/155 |
| 5,429,561 | 7/1995 | Wakahara et al. | 477/156 |
| 5,445,579 | 8/1995 | Fujita et al. | 477/156 |

FOREIGN PATENT DOCUMENTS

A-2-150557  6/1990  Japan .

Primary Examiner—Richard M. Lorence
Assistant Examiner—Ankur Parekh
Attorney, Agent, or Firm—Oliff & Berridge, PLC

[57] ABSTRACT

To optimize the application hydraulic pressure of the friction application elements in the transmission mechanism, and to reduce the unnecessary load on each member, the transmission mechanism of an automatic transmission is provided with a plurality of friction application elements which are applied simultaneously in order to achieve the designated gear stage, and hydraulic servos which operate the friction application elements independently. The control apparatus has an information detecting means, an input torque calculating means which calculates the input torque of the transmission mechanism on the basis of this information, an application hydraulic pressure calculating means which calculates the necessary application hydraulic pressure required to maintain the application of each individual friction application element on the basis of the input torque, and a supply means which supplies the necessary application hydraulic pressure to the hydraulic servos of the friction application elements. The supply means makes the hydraulic pressure supplied to each hydraulic servo the necessary application hydraulic pressure calculated for each friction application element independently when achieving the designated gear stage.

7 Claims, 19 Drawing Sheets

|     | C-1 | C-2 | B-1 | B-2 | B-3 | B-R |
|-----|-----|-----|-----|-----|-----|-----|
| P   |     |     |     |     |     |     |
| REV | ○   |     |     |     |     | ○   |
| N   |     |     |     |     |     |     |
| 1ST | ○   |     |     |     | ○   |     |
| 2ND |     | ○   |     |     | ○   |     |
| 3RD | ○   | ○   |     |     |     |     |
| 4TH |     | ○   | ○   |     |     |     |
| 5TH |     | ○   |     | ○   |     |     |

FIG.3

|  | POST GEAR SHIFT (TARGET) SPEED STAGE | | | | | |
|---|---|---|---|---|---|---|
| PRE-GEAR SHIFT SPEED STAGE | 1ST | 2ND | 3RD | 4TH | 5TH | Rev |
| 1ST |  | B-3 | C-1 | – | – | C-1 |
| 2ND | B-3 |  | C-2 | C-2 | C-2 | – |
| 3RD | C-1 | C-2 |  | C-2 | C-2 | – |
| 4TH | – | C-2 | C-2 |  | C-2 | – |
| 5TH | – | C-2 | C-2 | C-2 |  | – |
| Rev | C-1 | – | – | – | – |  |

FIG.9

Tin = t · TE

CONTROL APPARATUS FOR AUTOMATIC TRANSMISSIONS

BACKGROUND OF THE INVENTION

1. Field of Invention

The invention relates to an automatic transmission control apparatus, and more particularly, to a control apparatus which optimizes the application pressure of each of the friction application elements which maintain the designated gear in the transmission mechanism of the automatic transmission.

2. Description of Related Art

In automatic transmissions having stages in which transmission elements are composed of a combination of planetary gears, in order to achieve a designated gear, torque transfer elements in the transmission mechanism are mutually applied, or a brake and clutch composed of friction application elements are used in order to mesh reaction elements to fixed members. Furthermore, there are apparatuses in which the hydraulic pressure of the hydraulic servo that operates these friction application elements are directly controlled via the hydraulic pressure control apparatus through an electronic signal output by an electronic control apparatus. In this kind of automatic transmission, during gear shifts the hydraulic pressure of the friction application elements is controlled so as to achieve designated application characteristics, and when the gear shift has concluded, control is effected which causes the hydraulic pressure to rise to the line pressure in order to maintain the stabilized application state of the applied friction application elements. One example of technology which employs this type of control is the technology disclosed in Japanese Laid-Open Patent Publication 2-150557.

However, the hydraulic pressure needed in order to maintain the application of the friction application elements is essentially never the same for each of the friction application elements because the torque allotment, the torque capacity of the friction materials and the surface area of the hydraulic servo which receives pressure differ for each of the 4friction application elements. On the other hand, the line pressure at this kind of normal time must be a hydraulic pressure such that the friction application elements with the largest torque load can maintain a complete application state. Accordingly, when application of a plurality of friction application elements is necessary in order to achieve a designated gear, the line pressure is increased to the level of the friction application element which requires the highest application hydraulic pressure. Through this, in the hydraulic servo of the friction application elements with low application hydraulic pressure, hydraulic pressure is supplied which is higher than the hydraulic pressure needed to maintain application. As a result, in the hydraulic servo and friction materials of the friction application elements for which low hydraulic pressure is sufficient, the pushing pressure of the hydraulic servo and the pressure of the hydraulic pressure itself act more than necessary, exerting a greater load than is needed on not only the friction materials and the hydraulic servo but also the related members, which is disadvantageous in terms of maintaining the durability of the various members and is also undesirable from the standpoint of causing the apparatus to become larger as a strength countermeasure.

SUMMARY OF THE INVENTION

It is a first objective of the invention to provide an automatic transmission control apparatus which can be made more compact and in which the durability of the apparatus can be improved by reducing the unnecessary load on the various members through optimizing the application hydraulic pressure of each of the friction application elements in the transmission mechanism.

It is a second objective of the invention to reduce the unnecessary load on the various members in the above-described control apparatus even during gear shifts by causing the application hydraulic pressure during gear shifts in the friction application elements which maintain application through the gear shift to change in accordance with the change in the necessary hydraulic pressure linked to the progress of the gear shift.

Furthermore, it is a third objective of the invention to accomplish the indispensable detection of the progress status through a simple composition in order to effect the above-described control.

When control is effected which causes the application hydraulic pressure during shift change to change as described above, the gear shift is the transition period of the torque load of the friction application elements, and when the correspondence of the application hydraulic pressure to the change in the input torque is delayed, there is concern about engine racing and the worsening of the gear shift response caused by insufficient application force. Hence, it is a fourth objective of the invention to prevent delays in the correspondence of the application hydraulic pressure.

Furthermore, it is a fifth objective of the invention to simplify the composition of the control apparatus by making it so that the information about the input torque which is necessary for control can be obtained from existing sensors in a normal automatic transmission.

In addition, it is a sixth objective of the invention to prevent insufficiency of the application force of each of the friction application elements even in states in which the detection precision of the information necessary for calculating the input torque cannot be maintained.

Furthermore, it is a seventh objective of the invention to realize, through a simple composition control, prevention of the above-described insufficiency of the application force.

In order to achieve the above-described first objective, the invention is an automatic transmission control apparatus, of the type comprising a transmission mechanism having a plurality of friction application elements which are simultaneously applied in order to achieve a designated gear; hydraulic servos which individually operate the friction application elements; and supply means which supply hydraulic pressure to the hydraulic servos in order to operate each of the friction application elements; the automatic transmission control apparatus comprising: an information detecting means which detects information relating to the functioning of the transmission mechanism; an input torque calculating means which calculates the input torque of the transmission mechanism on the basis of the functioning information which is detected; and an application hydraulic pressure calculating means which calculates the necessary application hydraulic pressure needed to maintain the application of the individual friction application elements on the basis of the calculated input torque; wherein the supply means takes the hydraulic pressure supplied to the various hydraulic servos as the necessary application hydraulic pressure calculated for each friction application element when the designated gear is achieved.

In order to achieve the above-described second objective, the invention is an apparatus wherein at least one of the friction application elements, out of the plurality of friction application elements, maintains application through the gear shift at the time of the gear shift to the designated gear, the information detecting means detects the progress state of the actual gear shift of the transmission mechanism, and the application hydraulic pressure calculating means causes the necessary application hydraulic pressure to change in accordance with the detected progress state.

In order to achieve the above-described third objective, the information detecting means has an input rotation detecting means that detects the number of input rotations of the transmission mechanism and an output rotation detecting means which detects the number of output rotations; and the progress state is detected by the change in the gear ratio during the gear shift of the number of input rotations and the number of output rotations which are detected, and the application hydraulic pressure calculating means causes the necessary application hydraulic pressure to change in accordance with the change in the gear ratio.

In order to achieve the above-described fourth objective, the information detecting means has a throttle openness detecting means which detects the openness of the engine throttle; and the application hydraulic pressure calculating means calculates the necessary application hydraulic pressure by adding the correction torque set in accordance with the change in the throttle openness separate from the input torque calculated by the input torque calculating means, when the throttle openness changes during a gear shift.

In order to achieve the above-described fifth objective, the automatic transmission is equipped with a torque converter which transfers the engine torque to the transmission mechanism; the information detecting means has an engine rotation detecting means which detects the number of rotations of the engine, a throttle openness detecting means which detects the openness of the engine throttle, and a turbine rotation detecting means which detects the number of turbine rotations of the torque converter; and the input torque calculating means detects the engine torque from the throttle openness and number of engine rotations which have been detected, and changes the calculated engine torque to the input torque through the torque ratio from the number of engine rotations and the number of turbine rotations, the ratio obtained on the basis of the number of input and output rotations of the torque converter.

In order to achieve the above-described sixth objective, when the designated gear is achieved from a state in which the engine torque is not transferred to the transmission mechanism, the input torque calculating means calculates the predicted input torque by predicting the input torque input into the transmission mechanism when the designated gear is achieved; and the application hydraulic pressure calculating means calculates the necessary application hydraulic pressure on the basis of the predicted input torque which was calculated.

In order to achieve the above-described seventh objective, the automatic transmission has a torque converter which transfers the engine torque to the transmission mechanism; the information detecting means has an engine rotation detecting means which detects the number of engine rotations, a throttle openness detecting means which detects the openness of the engine throttle, and an output rotation detecting means which detects the number of output rotations of the transmission mechanism; and the input torque calculating means calculates the engine torque from the throttle openness and the number of engine rotations which were detected, and converts the engine torque which has been calculated into the predicted input torque by predicting the number of output rotations of the torque converter from the detected number of output rotations and the gear ratio at the time the designated gear is achieved, and from the torque ratio obtained on the basis of the number of input rotations of the torque converter from the number of engine rotations which was detected and the number of output rotations which was predicted.

In the above-described composition of the first objective, it is possible to make it so that a greater than necessary load does not act on the friction application elements and the various members related thereto because the hydraulic pressures necessary to maintain application for each of the friction application elements which are applied in order to achieve a designated gear are detected separately on the basis of the input torque and the respective necessary application hydraulic pressures are supplied to the various hydraulic servos, and the apparatus is made more compact by reducing the strength requirements in order to improve the durability through easing of the loads.

In addition, in the composition of the second objective, it is possible to cause the hydraulic pressure to change in accordance with the change in the necessary hydraulic pressure of the friction application elements through progress of the gear shift with respect to the friction application elements which maintain application during the gear shift, and consequently, it is possible to make it so that greater than necessary loads do not act on the friction application elements or the various members related thereto even during gear shifts.

Furthermore, in the composition of the third objective, it is possible to effect control which causes the hydraulic pressure to change as described above by detecting the progress status through an information detection means of simple composition.

Next, in the composition of the fourth objective, during a gear shift it is possible to cause the application hydraulic pressure to change in accordance with the amount of change in the throttle openness in connection with the creation of this change in the throttle openness, and consequently, particularly when the change in the throttle openness is in the rising direction, it is possible to cause the application hydraulic pressure of the friction application elements to rise in advance of the rising of the engine torque which is delayed somewhat with respect to this change, and it is possible to prevent delays in the gear shift and engine racing caused by transitional application force insufficiency in the friction application elements.

Furthermore, in the composition of the fifth objective, it is possible to detect the input torque through the input from the existing sensor without using a torque sensor or the like.

In addition, in the composition of the sixth objective, it is possible to prevent inadequate application force caused by detection delays by predicting beforehand the input torque, even in cases where detection of the change in the input torque is difficult because the number of input rotations necessary in order to calculate the input torque is low.

Furthermore, in the composition of the seventh objective, it is possible to perform predictions of the input torque using a simple composition.

BRIEF DESCRIPTION OF THE DRAWINGS

The invention will be described with reference to the drawings in which:

FIG. 3 is an action table of the above-described automatic transmission;

FIG. 9 is a reference table for the control target application element and the gear stage of the above-described gear shift application pressure control;

DETAILED DESCRIPTION OF THE PREFERRED EMBODIMENT

Figure 2:
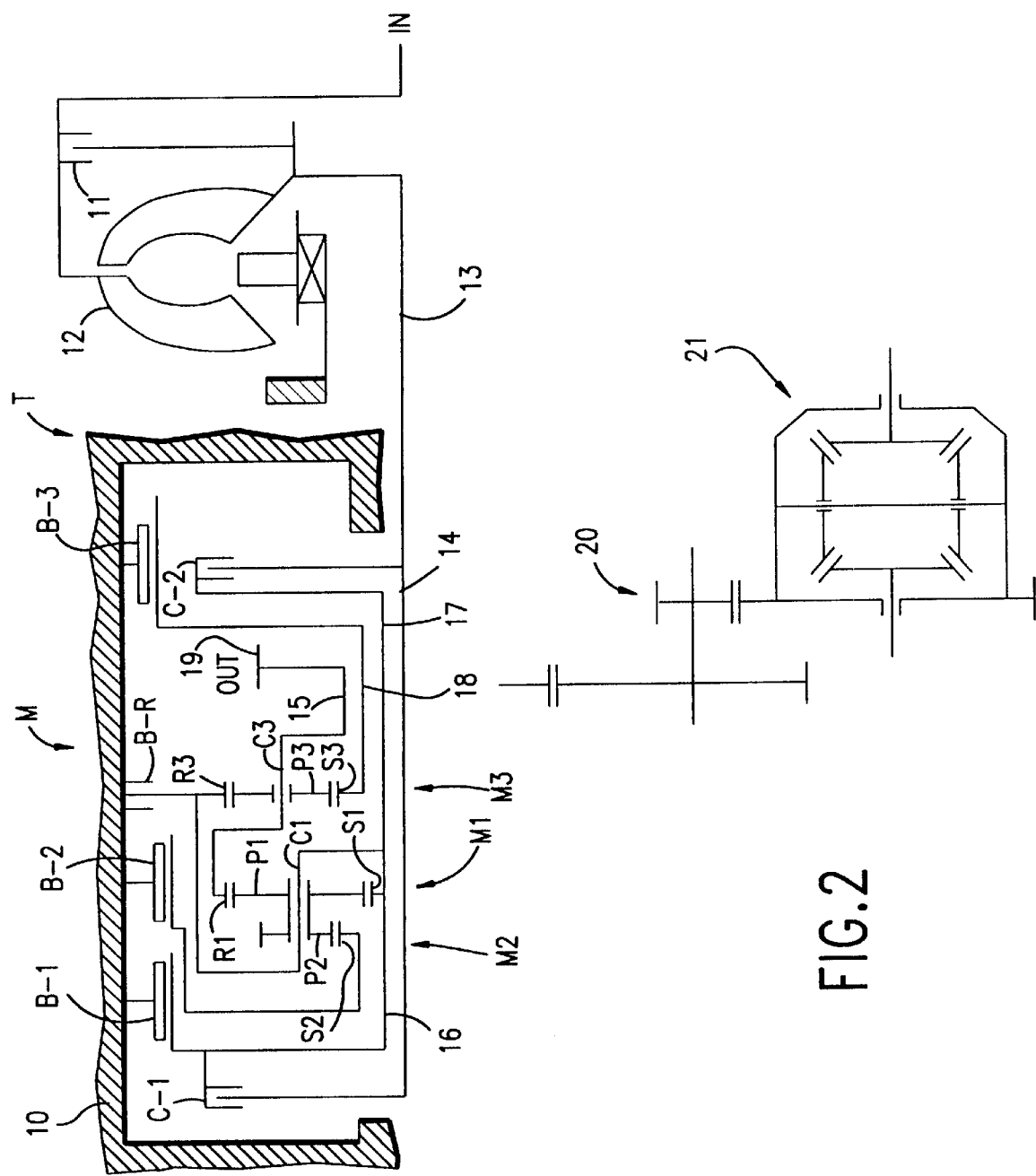
FIG. 2 is a schematic drawing showing the mechanism of the transfer apparatus which includes an automatic transmission to which the invention has been applied.

Hereafter, the preferred embodiment of the invention will be described with reference to the attached drawings. First, in order to explain the basic composition of the mechanism, FIG. 2 shows a configuration wherein the invention is given concrete expression as a transfer apparatus having a horizontal composition by combining a differential apparatus with an automatic transmission to which the control apparatus of the invention has been applied. This transfer apparatus comprises a torque converter 12 with an attached lockup clutch 11 linked to the engine of the vehicle, an automatic transmission T composed of a transmission mechanism M having a three stage planetary gear set M1, M2 and M3 which shifts the output of the converter to five forward gears and one reverse gear, and a differential apparatus 21 which is linked to this transmission via a counter gear 20 which also functions as a deceleration mechanism, this differential apparatus transferring the transferred output of the automatic transmission T to the left and right wheels of the vehicle.

Pinion gears $P_1$, $P_2$ of differing diameters in the two gears sets M1, M2, respectively, of the transmission mechanism M in the automatic transmission T are directly linked; a ring gear $R_1$ of the gear set M1 and a carrier $C_1$ of the gear set M3, and a ring gear $R_3$ of the gear set M3 and a carrier $C_1$ of the gear set M1, are mutually linked; and the sun gear Si of the gear set M1 is connected to the input shaft 14 linked to the turbine shaft 13 of the torque converter 12 via a clutch C-1 which is the input element, and in addition via a clutch C-2 which is also an input element. In addition, the mutually linked ring gear $R_1$ and carrier $C_3$ are linked to an output gear 19 which acts as an output element via an output shaft 15. Furthermore, the sun gear $S_1$ of the gear set M1 can enmesh with the transmission case 10 by means of a brake B-1, the sun gear $S_2$ of the gear set M2 can enmesh with the transmission case 10 by means of a brake B-2, the sun gear $S_3$ of the gear set M3 can similarly enmesh with the transmission case 10 by means of a brake B-3, and the ring gear $R_3$ linked to the carrier $C_1$ can enmesh with the transmission case 10 by means of a brake B-R.

To be more detailed, the sun gear $S_1$ is linked to the clutch C-1 via a sun gear shaft 16 which fits into the outer perimeter of the input shaft 14, the carrier $C_1$ is linked to the clutch C-2 via a carrier shaft 17 which fits into the outer perimeter of the input shaft 14, and the sun gear $S_3$ is linked to the brake B-3 via a sun gear shaft 18 which fits into the outer perimeter of the carrier shaft 17. In addition, in this configuration, each of the brakes, excluding the brake B-R, has a band brake composition, and for the clutches C-1 and C-2 and the brake B-R, the composition is a multiple plate (disk) format. The hydraulic servos are not shown in the drawings. Furthermore, the output gear 19 which acts as the output device is linked to the differential apparatus 21 via the counter gear 20.

Figure 3:
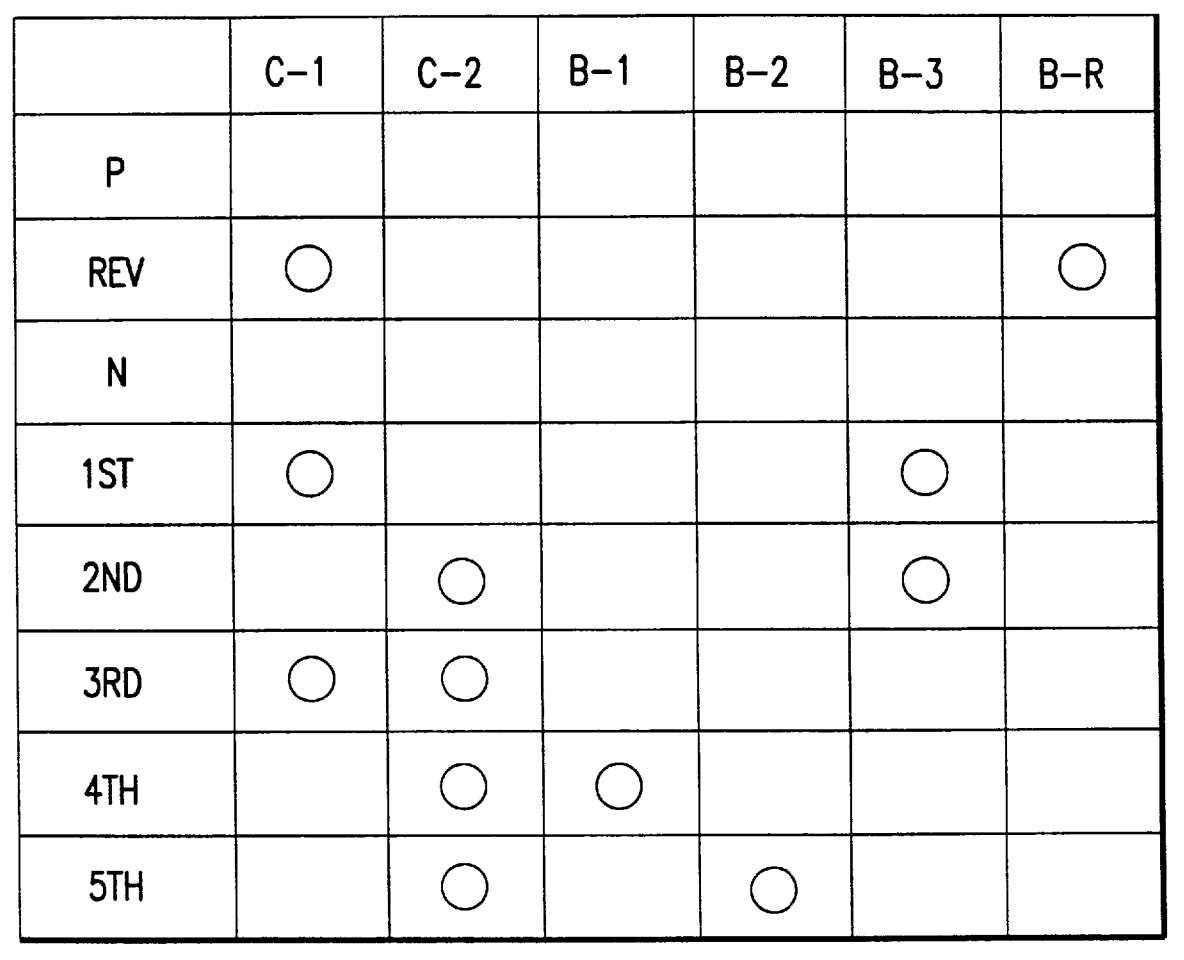

The automatic transmission T, thus comprised, supplies hydraulic pressure to the hydraulic servos corresponding to each of the clutches and brakes under control from a hydraulic pressure control apparatus and electronic control apparatus described below with reference to FIG. 1 and, as shown in FIG. 3, each of the gears is achieved by causing the application (indicated by a 0 in the drawing) and releasing (indicated by the absence of a mark in the drawing) of each of the clutches and brakes.

That is to say, first speed range (1st) is achieved by the application of two friction application elements, that is to say, the application of the clutch C-1 and the brake B-3. At this time, the power input into the transmission mechanism M from the engine via the torque converter 12 enters the sun gear $S_1$ from the input shaft 14 via the clutch C-1, and through the enmeshing of the sun gear $S_3$ through application with the brake B-3, is output to the output gear 19 as the rotation of the carrier $C_3$ decelerated the most through the revolution of the pinion gear $P_3$.

Next, second speed range (2nd) is achieved by the application of the other clutch C-2 with this same brake B-3. At this time, the input force which enters the carrier shaft 17 via the clutch C-2 enters the ring gear $R_3$ without change via the carrier $C_1$, and is output to the output gear 19 as the differential rotation of the carrier $C_3$ which uses as the reaction element the sun gear $S_3$ enmeshed by application with the brake B-3.

In addition, the third speed range (3rd) is achieved by directly linking the first planetary gear set M1 through the application of the two clutches C-1, C-2. Accordingly, the rotation of the input shaft 14 at this time is output to the output gear 19 as the rotation of the carrier $C_3$ which is linked to the ring gear $R_1$ without change.

Gears from fourth speed range (4th) and up in this transmission mechanism are considered overdrive, and fourth speed range (4th) is achieved by the application of the clutch C-2 and the application of the brake B-1 which enmeshes the sun gear $S_1$. At this time, the rotation of the input shaft 14 is transferred to the output gear 19 from the carrier $C_3$ as the rotation of the ring gear $R_1$ accelerated by the amount of revolutions of the pinion gear $P_1$ with respect to the rotation of the carrier $C_1$.

In contrast to this, fifth speed range (5th) is achieved through the application of the clutch C-2 and the application of the brake B-2, and at this time, the rotation of the input shaft 14 is transferred to the output gear 19 from the carrier $C_3$ as the rotation of the ring gear $R_1$ which is further accelerated from the time fourth speed range is achieved by the amount of revolutions of the small diameter pinion gear $P_2$, which reacts to the large diameter sun gear $S_2$.

In addition, reverse (REV) is achieved by the application of the clutch C-1 and the brake B-R, and at this time, the rotation of the carrier $C_1$ is stopped by the enmeshing of the ring gear $R_3$ to the case 10 through the application of the brake B-R, with respect to the input from the sun gear $S_1$ via the clutch C-1, and the rotation of the ring gear $R_1$ in which reverse rotation is decelerated by the revolutions of the pinion gear $P_1$ is output from the output gear 19 via the carrier $C_3$.

Figure 1:
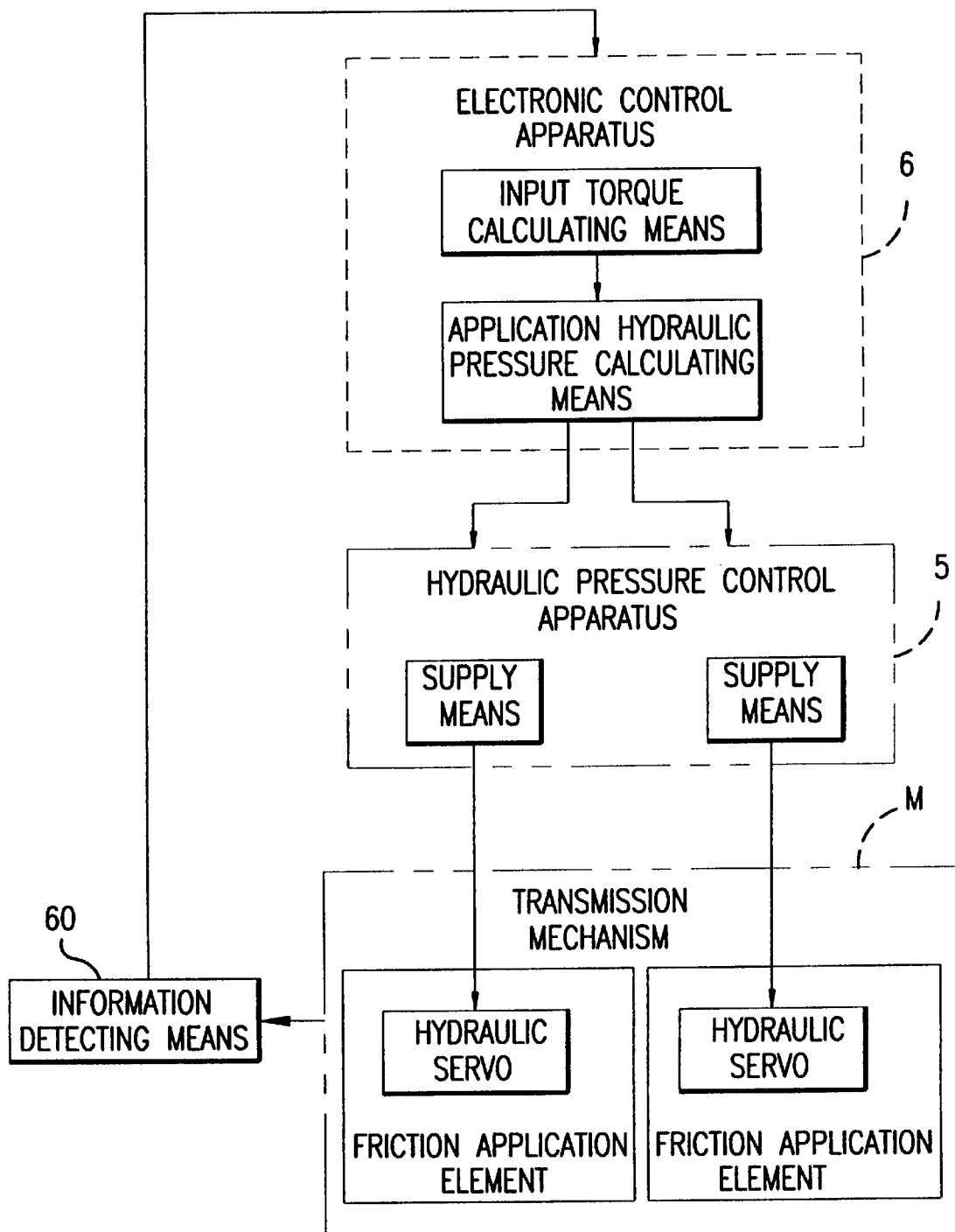
FIG. 1 is a block diagram showing schematically the preferred embodiment of the automatic transmission control apparatus of the invention.

In the automatic transmission T, having this structure, the control apparatus which controls the hydraulic pressure of the hydraulic servos of each of the friction application elements is, as shown in FIG. 1, centered around an electronic control apparatus (ECU) 6 and is composed of sensors 60 placed in the various parts of the automatic transmission as information input means to the ECU; linear solenoid valves as electronic control units which are arranged in the hydraulic pressure control apparatus 5 of the automatic transmission as the target of this control; and hydraulic pressure control units are composed of supply means comprising circuits inside the hydraulic pressure control apparatus 5 and hydraulic servos to which hydraulic pressure is supplied by the supply means; and each of the calculation means comprises a program in the electronic control apparatus 6.

Figure 4:
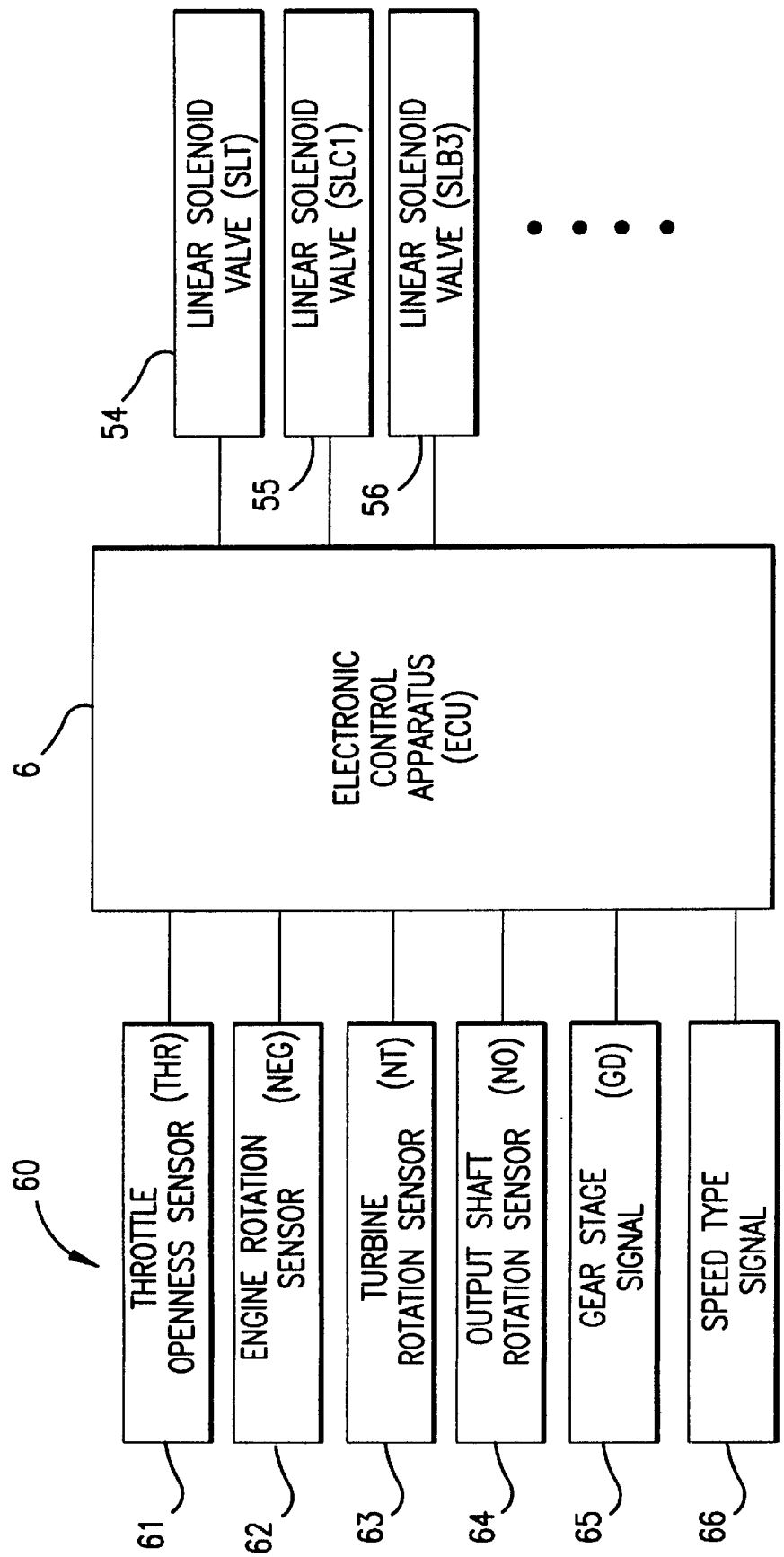
FIG. 4 is a block diagram showing a preferred embodiment of the electronic control unit of the above-described control apparatus.

As shown in detail in FIG. 4, the information detecting means 60 of the control apparatus is comprises a throttle openness sensor 61 which detects the throttle openness (THR) of the engine, an engine rotation sensor 62 which detects the number of engine rotations (NEG), a turbine rotation sensor 63 which detects the number of turbine rotations (NT) of the torque converter 12 from the turbine shaft 13 or the input shaft 14 of the transmission mechanism, an output shaft rotation sensor 64 which detects the number of output shaft rotations (NO) of the transmission mechanism M, a detecting means 65 for the gear signal (GD) and a detecting means 66 for the speed type signal. Out of these input means, the detecting means 65 for the gear signal (GD) may also be a sensor directly linked to this control apparatus, but in the present configuration, is taken to be a program which determines the gear stage from the number of turbine rotations (NT) and the number of output shaft rotations (NO). In addition, the detecting means 66 for the speed type signal may also be a sensor directly linked to this control apparatus, but in the present configuration, diverts use of the gear shift map (established in accordance with the vehicle speed and changes in the throttle openness) used in gear shift control which is stored in memory in the electronic control apparatus 6.

Figure 6:
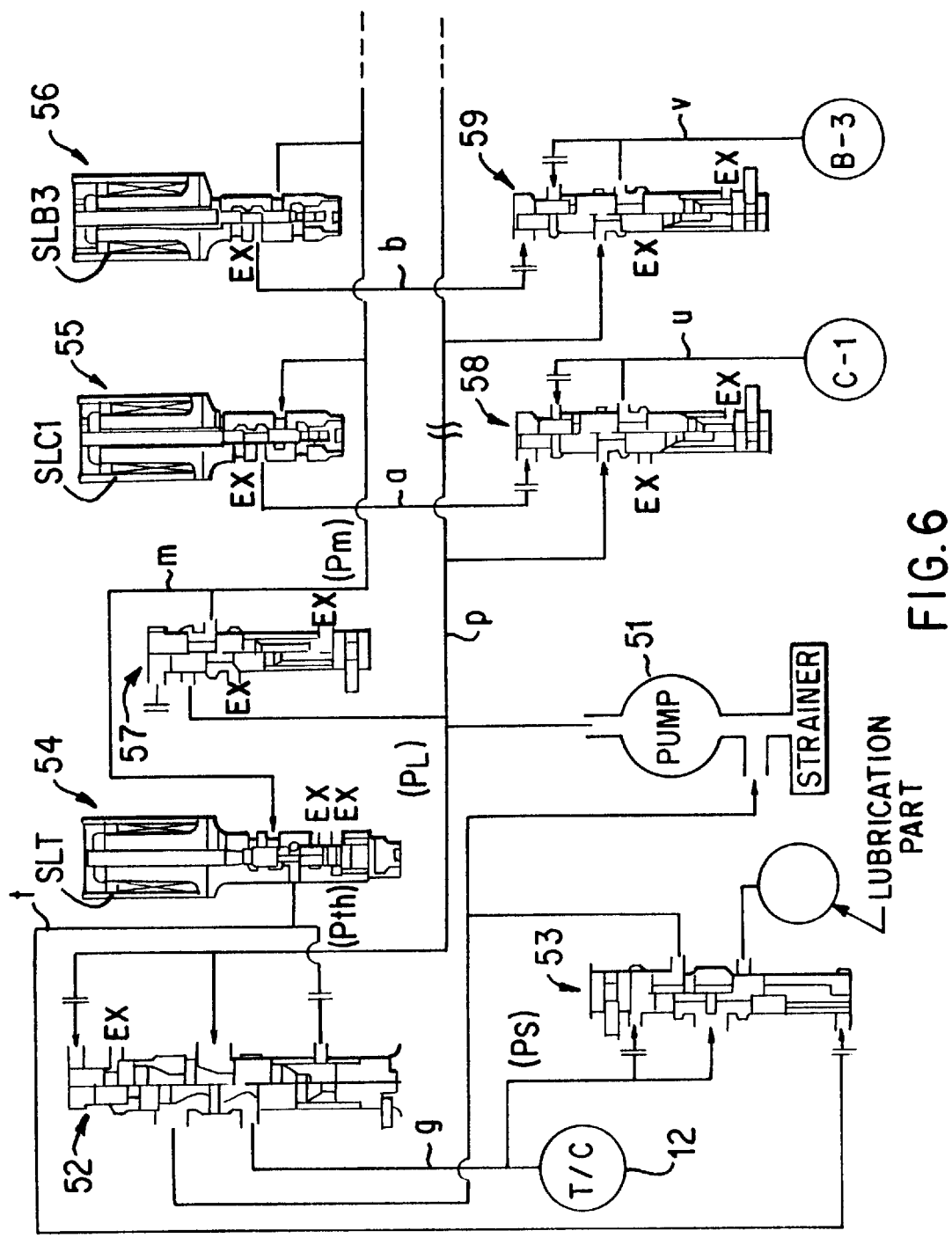
FIG. 6 is a circuit diagram of the hydraulic pressure control unit of the above-described control apparatus.

Next, the hydraulic pressure control apparatus 5 which controls each of the hydraulic servos that comprise the output means of the control apparatus has a composition including, as shown in FIG. 6, a pump 51 driven by the turbine shaft 13 as a hydraulic pressure source; a line pressure oil passage p linked to the outlet side of the pump 51, a primary regulator valve 52 which is connected to the oil passage p and maintains and regulates the line pressure ($P_L$) at each point in time by exhausting the hydraulic pressure to the appropriate secondary pressure oil passage q or returning such to the intake side of the pump 51; a secondary regulator valve 53 which is connected to the secondary pressure oil passage q and which maintains and regulates the secondary pressure ($P_s$) of the pressure supplied to the torque converter (T/C) 12 by appropriately exhausting the hydraulic pressure of the oil passage q to each of the lubrication parts of the automatic transmission or returning such to the intake side of the pump 51; a linear solenoid valve 54 having a solenoid (SLT) action which impresses a signal pressure on the two valves 52, 53 via a throttle pressure oil passage t; a solenoid modulator valve 57 which supplies to the solenoid valves, including the linear solenoid valve 54 and the linear solenoid valves 55, 56 having the solenoids SLC1, SLB3. Action, respectively, modulator pressure (Pm) which is suitable for the highly precise pressure regulation of these solenoids via the modulator pressure oil passage m, with the pressure reduced from the line pressure ($P_L$); and various control valves including control valves 58, 59 which are connected to the line pressure oil passage p and which correspond to the hydraulic servo of the clutch C-1 which receives the supply of hydraulic pressure and the hydraulic servo of the brake B-3. Each of the control valves 58, 59 acts to regulate the pressure after the signal pressure of the linear solenoid valve 55, 56 corresponding to each is impressed from the signal pressure oil passages a, b. In the location where the line pressure oil passage p is cut in the figure, a manual valve is inserted in order to switch ranges, the same as in the hydraulic pressure control apparatus of conventional automatic transmissions, although this is not shown in the drawing.

All of the solenoid valves, including the linear solenoid valves 55, 56, have the same structure, and each is comprised as a spool-shaped three-way valve that regulates the hydraulic pressure of the apparatus signal pressure oil passage a or b or the like to a designated pressure by connecting the signal pressure oil passage a or b or the like to the modulator pressure oil passage m and the drain (EX) in accordance with the control current value impressed on the linear solenoids SLC1, SLB3, and the like in opposition to the load of the return spring. In addition, all of the control valves, which includes the control valves 58, 59, have the same composition, and each is comprised as a spool-shaped three-way valve which regulates the hydraulic pressure of the appropriate pressure oil passage u or v or the like to the designated pressure described in detail hereafter by connecting the servo pressure oil passage u or v or the like to the line pressure oil passage p or the drain (EX) in accordance with the feedback pressure impressed on the diametrical difference portion and signal pressure impressed on the spool end in opposition to the load of the return spring. The hydraulic servos are symbolically shown in the drawings, but have the normal composition wherein a servo piston is pressed by hydraulic pressure in opposition to the load of the return spring, the friction board of the friction application element is depressed, or a band is tied to a drum.

Figure 5:
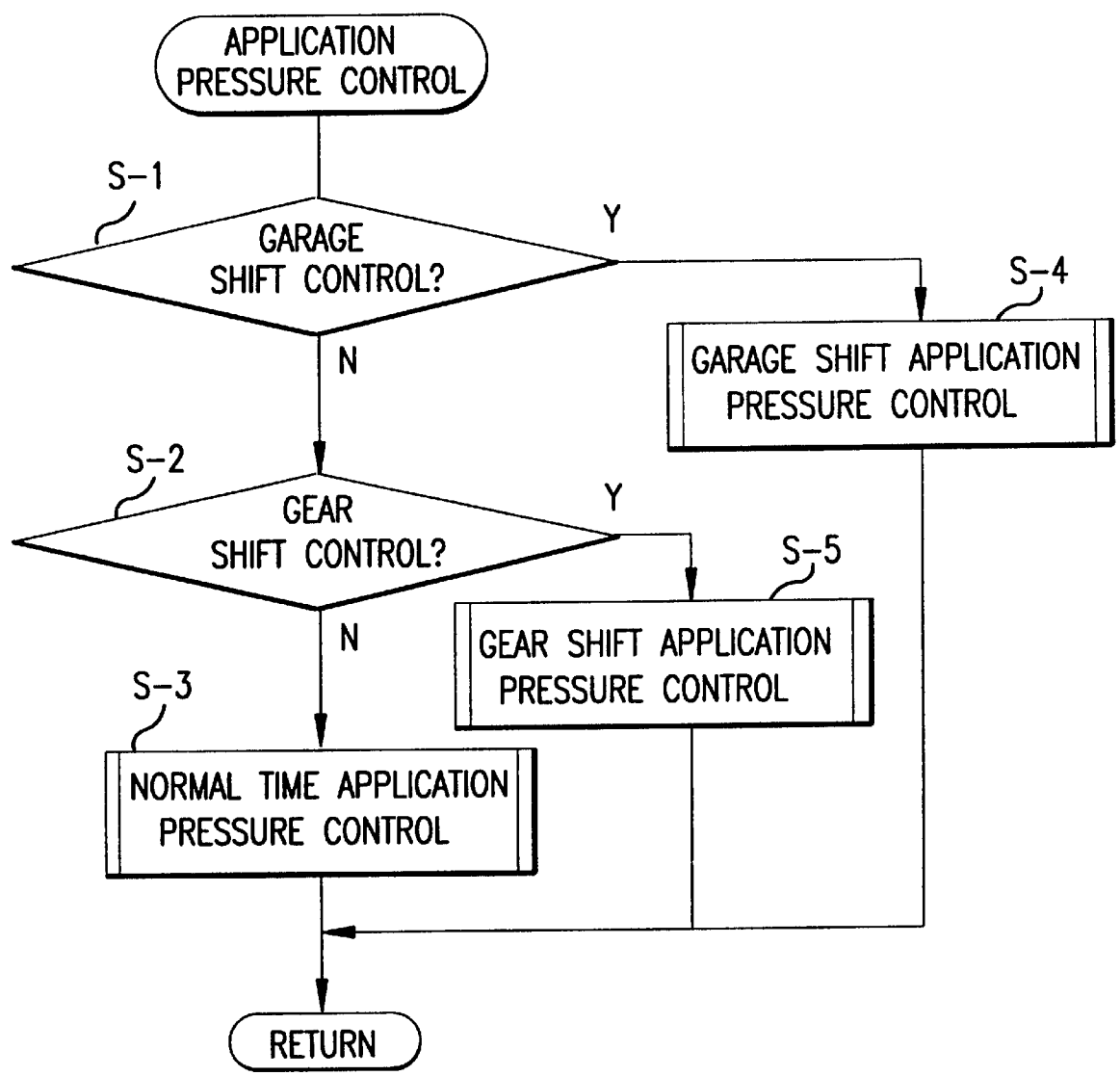
FIG. 5 is the main flowchart for the application pressure control by the above-described electronic control unit.

The control performed by the control apparatus having this structure will be described hereafter following the order given. First, FIG. 5 shows the main flow of the application pressure control in the electronic control apparatus 6. This flow has a structure wherein the normal time when the plurality of friction application elements maintains the application state is taken as the basis of control and in states which do not fall under this, the control configuration is altered, and accordingly, in the determination in the initial step S-1, garage shift control is excluded, and in the determination in step S-2, gear shift control is excluded, and step S-3 is a routine which executes normal application pressure control. Furthermore, during garage shift control, the garage shift application pressure control subroutine is executed in step S-4, and during gear shift control, a gear shift application pressure control subroutine is executed in step S-5.

Figure 7:
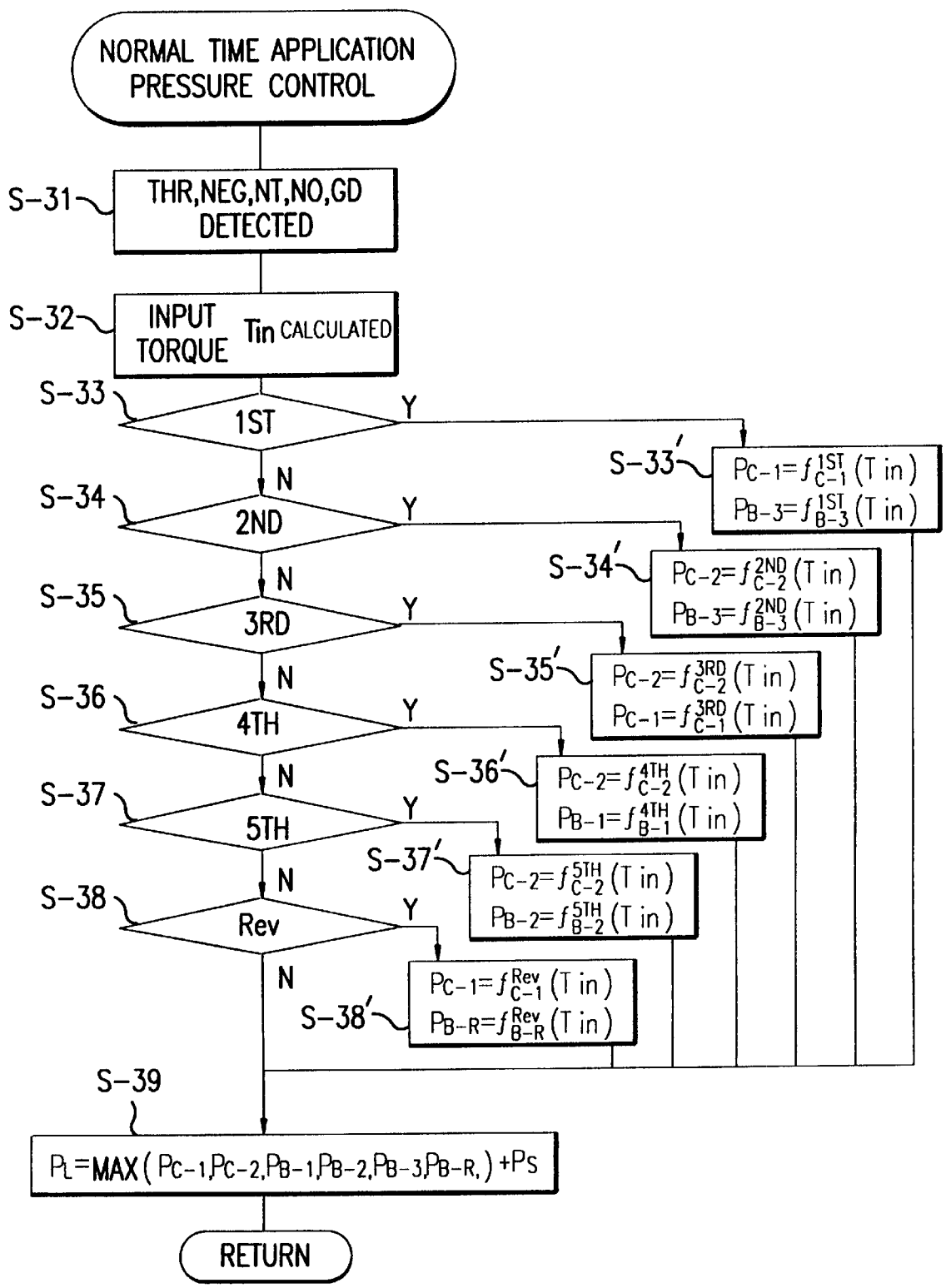
FIG. 7 is the flowchart for the normal time application force control in the above-described main flowchart.

FIG. 7 shows the details of the above-described normal time application pressure control subroutine. In this routine, in the first step S-31, the throttle openness (THR), number of engine rotations (NEG), number of turbine rotations (NT), number of output shaft rotations (NO) and gear stage (GD) are detected, and from these, in step S-32, the transmission input torque (Tin) is calculated. Furthermore, in the ensuing steps S-33 through S-38, a determination of the gear stage is accomplished, and the application pressure of the friction application elements according to each gear stage is calculated in steps S-33' through S-38'. Furthermore, in step S-39, the line pressure ($P_L$) is calculated by adding to the highest value out of the above-described application pressures (MAX ($P_{C-1}$, $P_{C-2}$, $P_{B-1}$, $P_{B-2}$, $P_{B-3}$, $P_{B-R}$)) the necessary hydraulic pressure for the actions of lubrication and of the torque converter. When the determination of first speed range (1st) is established in step S-33, the control target friction application elements become the clutch C-1 and the brake B-3, and consequently, in step S-33', the clutch application pressure ($P_{C-1}$) and the brake application pressure ($P_{B-3}$) are calculated as functions of the input torques to these elements. On the basis of the application pressures thus obtained, in step S-39 the line pressure ($P_L$) is calculated by adding the hydraulic pressure ($P_s$) to the larger of the clutch application pressure ($P_{C-1}$) and the brake application pressure ($P_{B-3}$).

Figure 11:
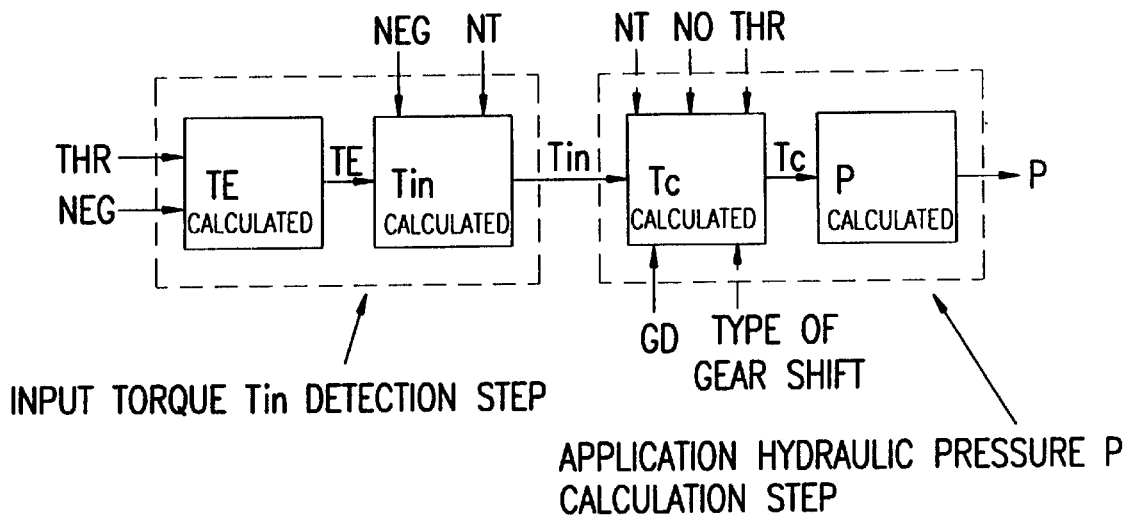
FIG. 11 is a block diagram of the application hydraulic pressure calculation and input torque calculation steps of the normal time and gear shift by the above-described control apparatus.
Figure 13:
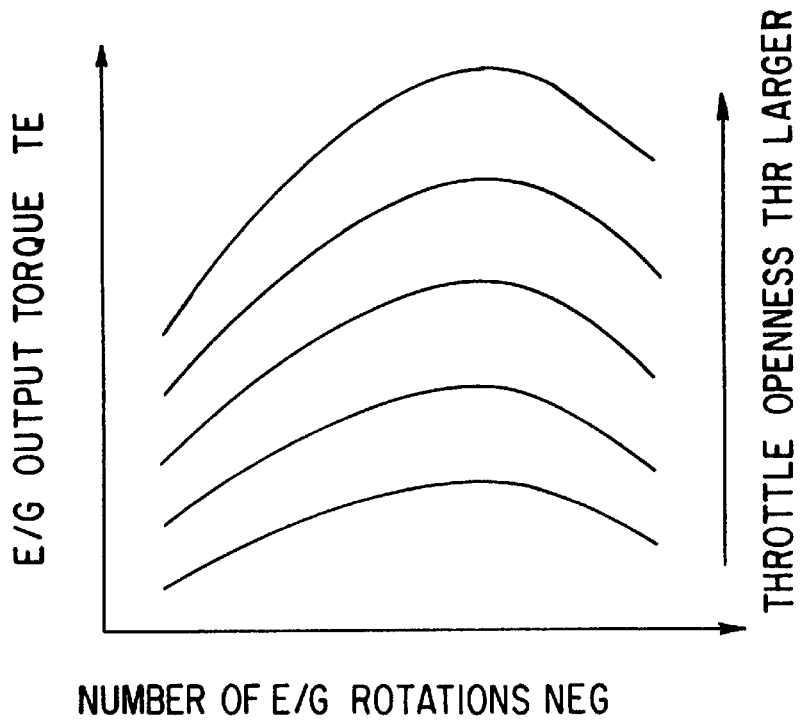
FIG. 13 is a characteristics diagram showing the data of the engine torque with respect to the number of engine rotations.
Figure 14:
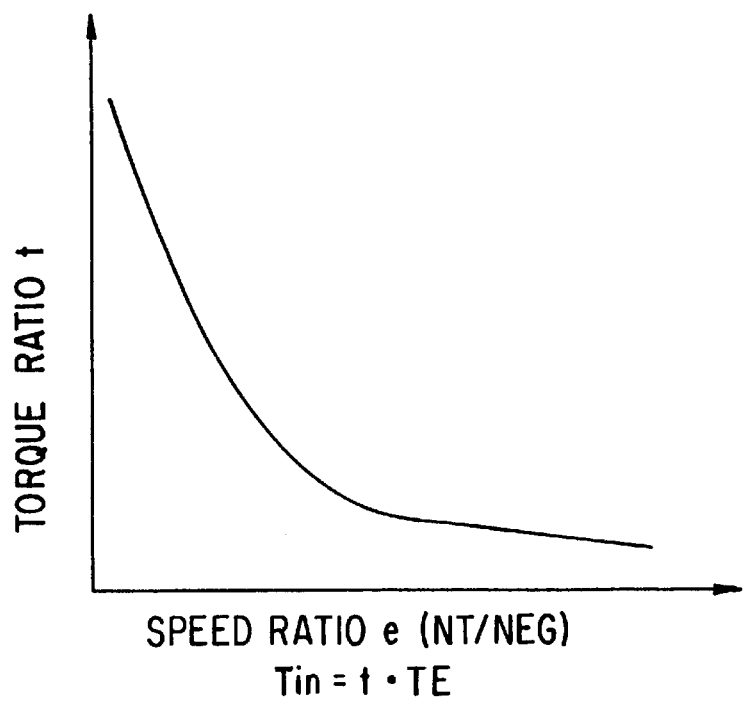
FIG. 14 is a characteristics diagram showing the data of the torque ratio with respect to the speed ratio.

FIG. 11 shows these calculation steps in blocks. As shown in the figure, in the input torque calculation step, which is the above step S-32, the engine torque (TE) is calculated from the data shown in FIG. 13 using as inputs the detected throttle openness (THR) and number of engine rotations (NEG). Using as inputs the engine torque (TE) thus obtained, the number of engine rotations (NEG) and the number of turbine rotations (NT), first the speed ratio (e) is calculated, the torque ratio (t) corresponding to this speed ratio (e) is then read from the data shown in FIG. 14, and the transmission input torque (Tin) is calculated by multiplying the torque ratio (t) and the engine torque (TE).

Figure 15:
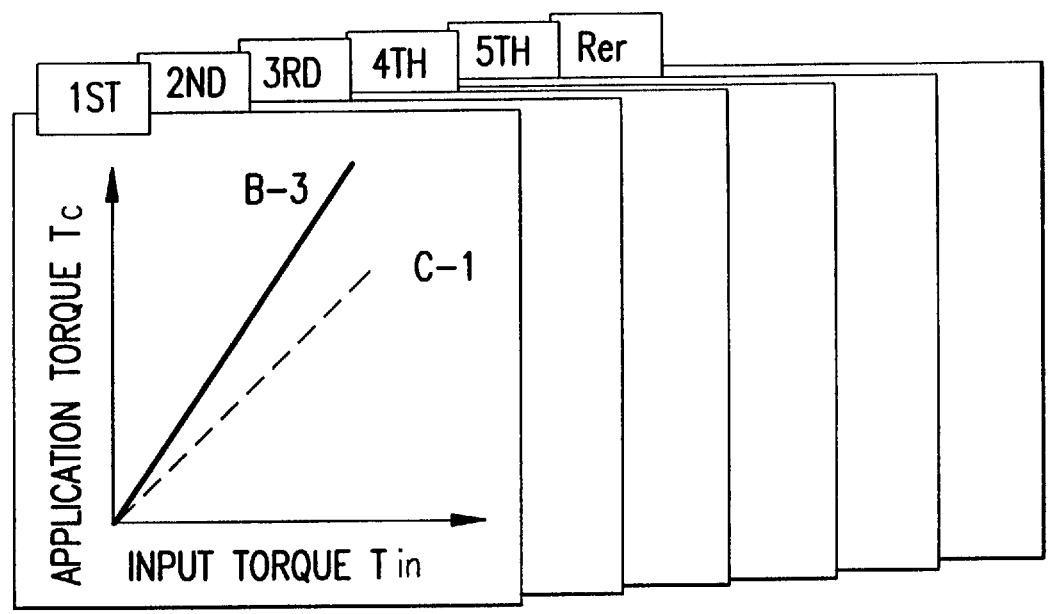
FIG. 15 is a characteristics diagram showing the data of the application torque with respect to the input torque.
Figure 16:
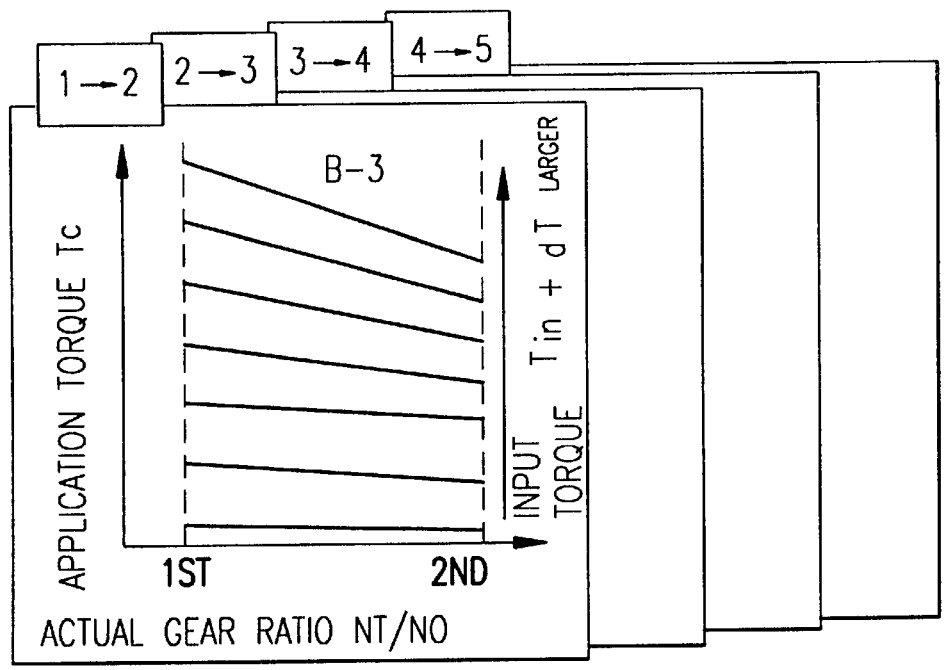
FIG. 16 is a characteristics diagram showing the data of the application torque with respect to the actual gear ratio.
Figure 18:
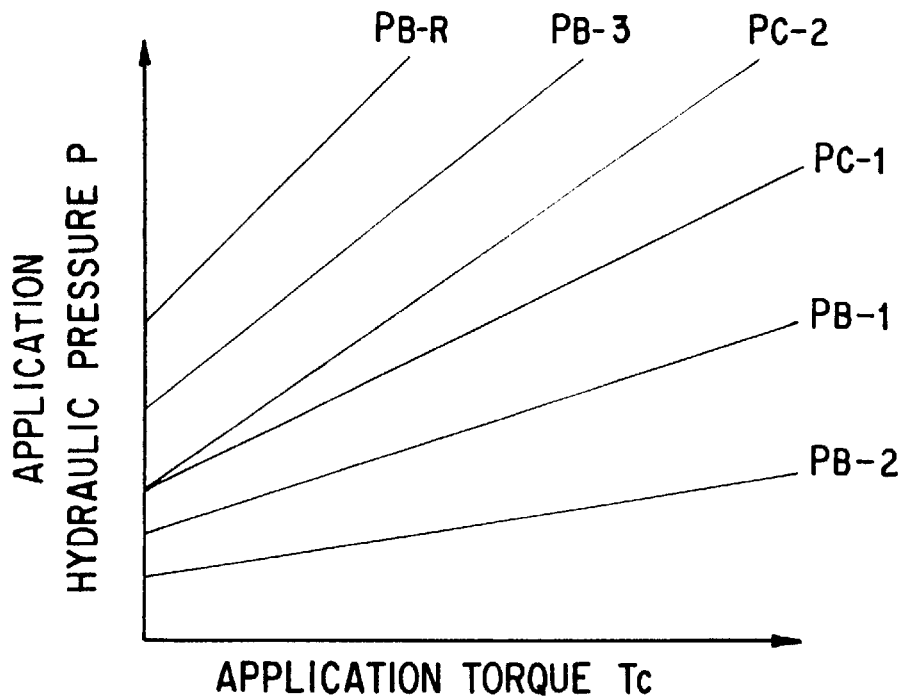
FIG. 18 is a characteristics diagram showing the data of the application hydraulic pressure with respect to the application torque.

When the input torque (Tin) is calculated in this way, the necessary application force (Tc) of each of the friction application elements is calculated from the data shown in FIG. 15 on the basis of the input torque (Tin) found previously by selecting a map from the current gear stage (GD) through the establishment of one of the determinations after the previous step S-33. Furthermore, the application force (Tc) which is calculated is converted into an application hydraulic pressure P($P_{C-1}$, $P_{C-2}$, $P_{B-1}$, $P_{B-2}$, $P_{B-3}$, $P_{B-R}$) through steps S-33' to S-38' by means of the data shown in FIG. 18. When this occurs, the hydraulic pressure P which is set is the sum of the hydraulic pressure necessary for the piston stroke of the hydraulic servos and a designated amount of allowance.

Each of the hydraulic pressure values obtained in this way are output from the electronic control apparatus 6, shown in FIG. 4, to the targeted linear solenoid valves by means of a duty signal. As a result, in the hydraulic pressure circuitry shown in FIG. 6, the signal is impressed on the spool end of each control valve reflecting the hydraulic pressure of the signal pressure oil passages a or b or the like, and each control valve acts to regulate the pressure and supplies the designated hydraulic pressure to the hydraulic servos while monitoring the servo pressure by means of feedback of the hydraulic pressure of the servo pressure oil passages. On the other hand, in the linear solenoid (SLT) of the linear solenoid valve 54, a duty signal corresponding to the line pressure value ($P_L$) calculated in step S-39 is output, a throttle pressure (Pth) corresponding to this is impressed on the primary regulator valve 52, and the pressure is regulated while monitoring the line pressure ($P_L$) through feedback of the hydraulic pressure of the line pressure oil passage p, thereby adjusting the hydraulic pressure of the line pressure oil passage p to a designated pressure.

Figure 20:
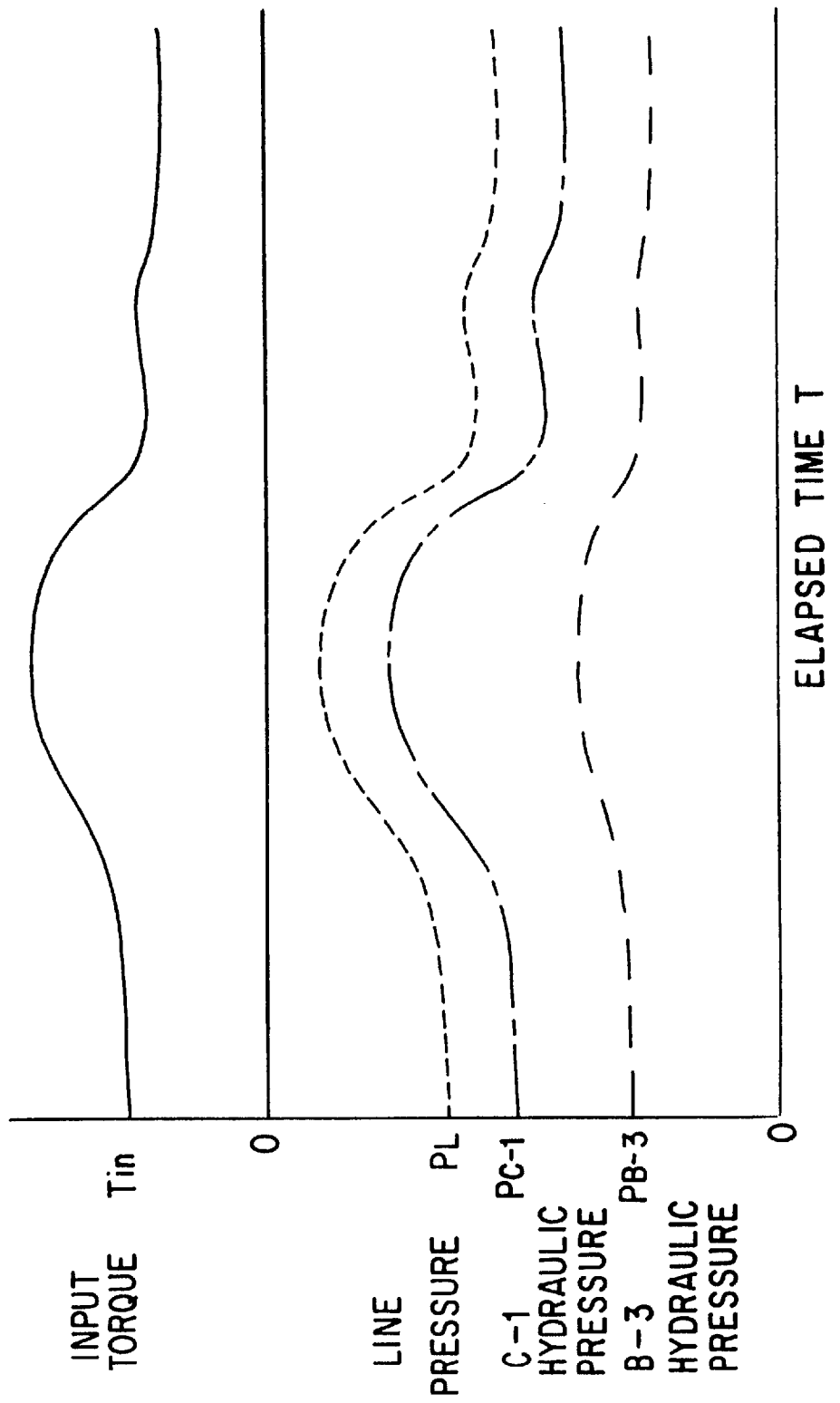
FIG. 20 is a time chart of the normal time control.

FIG. 20 shows one state of the above-described normal time control by means of a time chart for the first speed range (1st). As indicated by the solid line in the figure, when the input torque (Tin) changes, the line pressure ($P_L$), hydraulic pressure ($P_{C-1}$) of the clutch C-1 and hydraulic pressure ($P_{B-3}$) of the brake B-3 all change with the same characteristics following this line pressure, as indicated by the dotted line, the broken line and the dashed line, but through the control of the invention, these values respectively differ. That is to say, both of the servo pressures are directly controlled with the line pressure ($P_L$) as the base pressure through impressing a signal pressure on the C-1 control valve 58 and the B-3 control valve 59 through the linear solenoid valves 55, 56 of the hydraulic pressure circuit, and are controlled so as to be values which are appropriate for maintaining the application.

Figure 8:
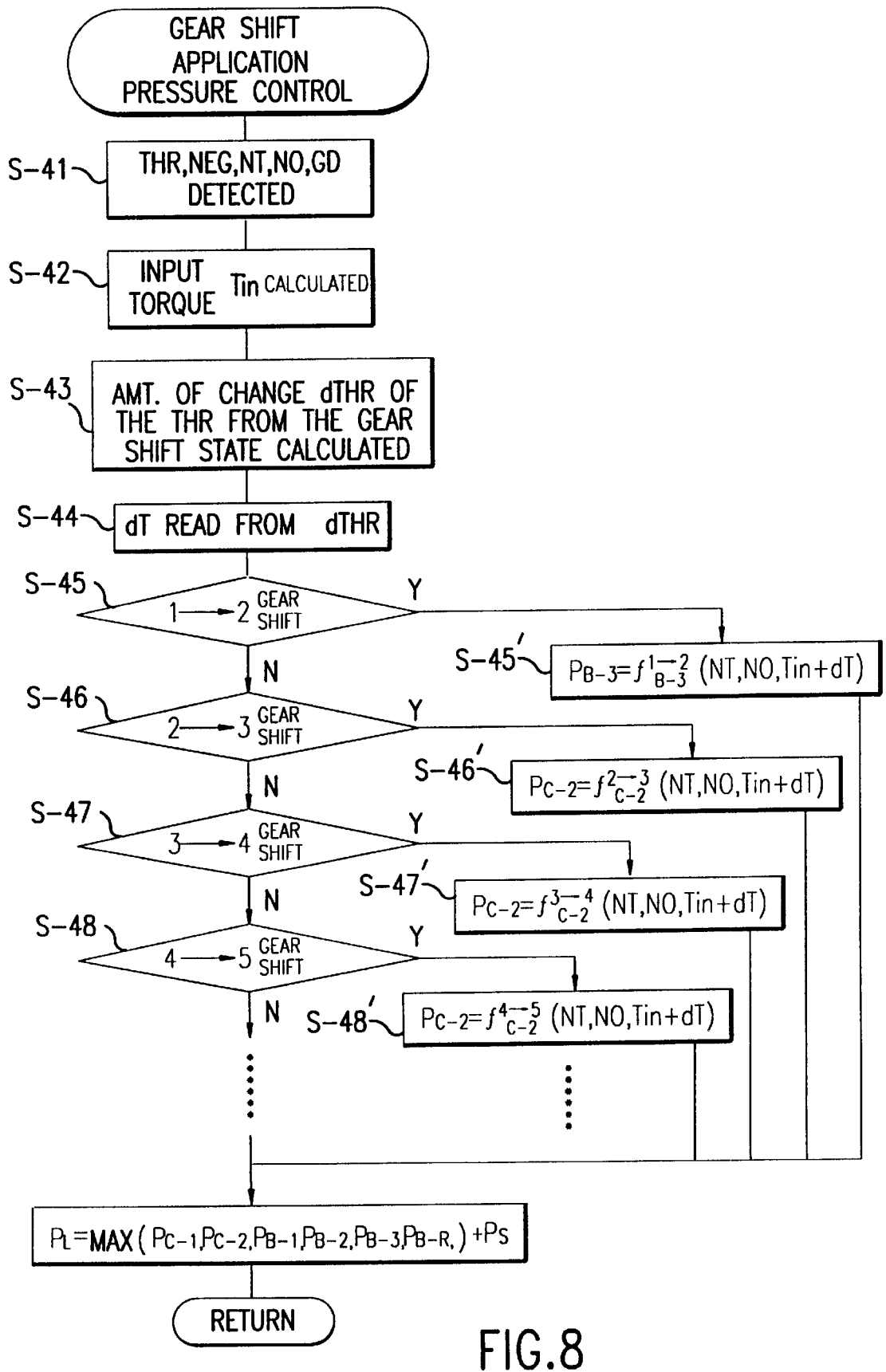
FIG. 8 is the flowchart for the gear shift application pressure control in the above-described main flowchart.

Next, FIG. 8 shows the details of the above-described gear shift application pressure control subroutine. In this routine, in the first step S-41 the throttle openness (THR), number of engine rotations (NEG), number of turbine rotations (NT), number of transmission output rotations (NO) and gear stage (GD) are similarly detected, and through this, the transmission input torque (Tin) is calculated in step S-42. Furthermore, in this case, in step S-43 the amount of change (dTHR) of the throttle openness (THR) from the start of the gear shift is calculated, and in step S-44 the correction torque (dT) is read from the amount of change (dTHR) which was obtained. Furthermore, from step S-45 on, determinations of the type of gear shift are performed, and the application pressure of the friction application elements in accordance with each of the types of gear shift are calculated from step S-45' on. In the case of a shift from first speed to second speed (hereafter abbreviated as 1→2 shift; similarly for the other gear shifts), at the time of the gear shift the friction application element which maintains application is the brake B-3, and consequently the application pressure ($P_{B-3}$) is calculated. When the types of gear shifts, including those omitted in the dot display in the above-described flow, and the application elements which are the target of control in these cases are listed in a table, FIG. 9 results. As can be seen from FIG. 9, when shifts which jump gears are included, in many cases one of the friction application elements maintains application.

The calculation step in this case is similar to the calculation step shown in FIG. 11, but only the calculation of the necessary application force (Tc) differs. In this case, the necessary application force (Tc) of the application element which maintains application during the gear shift is calculated so as to follow the change in the actual gear ratio on the basis of the actual gear ratio found from the number of turbine rotations (NT) and the number of output rotations (NO) by selecting a map from the type of gear shift. In this case, when change in the throttle openness (THR) is created during the gear shift, the correction torque (dT) corresponding to the amount of change (dTHR) in the throttle openness is found from the data shown in FIG. 19 in order to prevent slipping of the application element, and the application force (Tc) is determined by adding this correction torque (dT) to the input torque (Tin).

Figure 21:
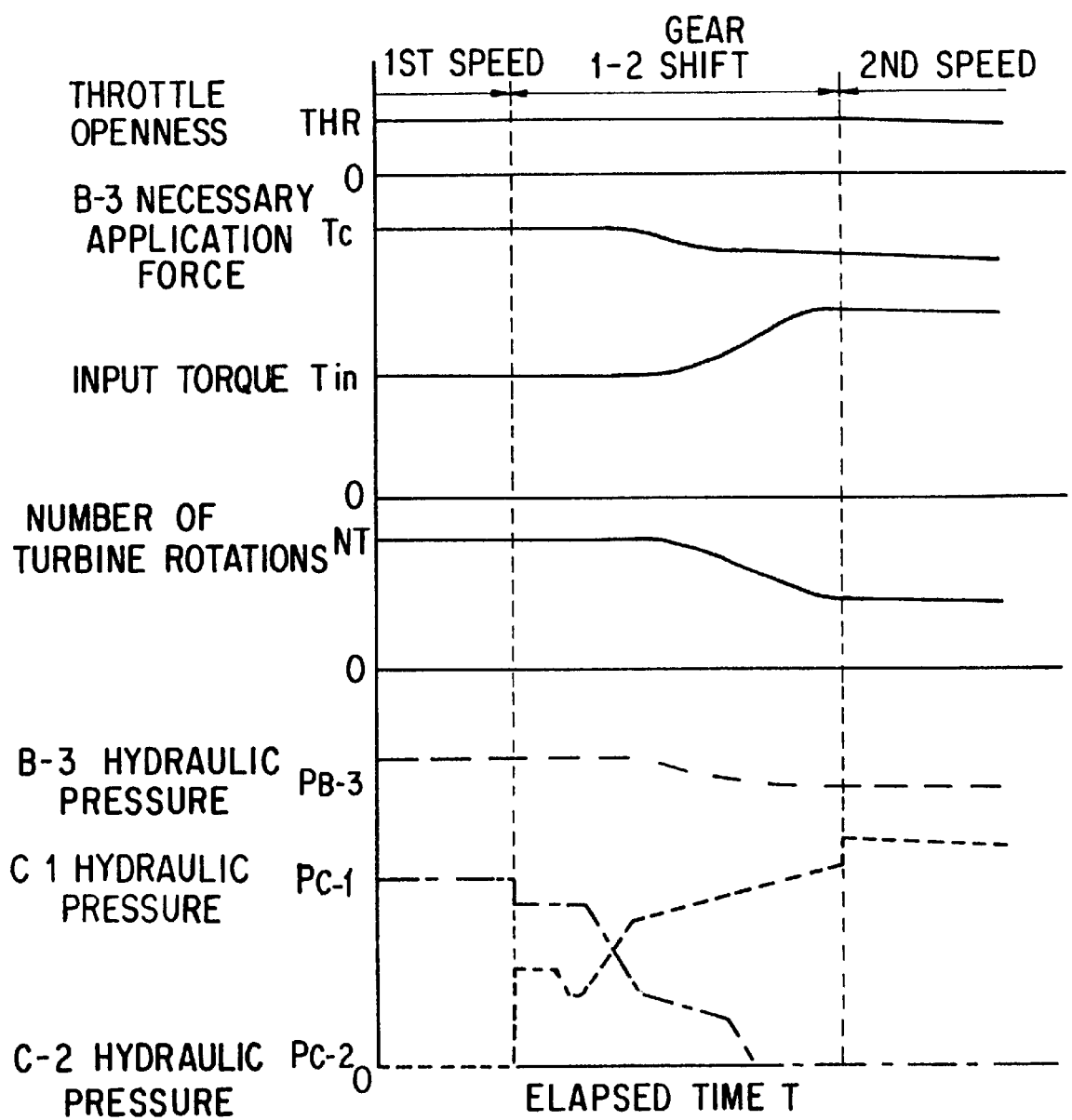
FIG. 21 is a time chart of the gear shift control under the state of constant throttle openness.

FIG. 21 shows the state when the throttle openness is a constant by means of the above-described gear shift control using a time chart of the 1→2 gear shift. As shown in this figure, the throttle openness (THR) is constant, but in contrast to this, the necessary application force (Tc) of the brake B-3 is the application force necessary for enmeshing for reaction torque support applied to the sun gear $S_3$, and consequently, becomes a low value through the decline of the reaction torque accompanying the gear shift, and the input torque (Tin) changes to a high value because the number of turbine rotations (NT) also drops with respect to the decrease in the gear ratio. When this occurs, the hydraulic pressure ($P_{B-3}$) of the brake B-3 which maintains brake's B-3 application, decreases accompanying the value of the necessary application force (Tc), as indicated by the dashed line. At the very bottom of the figure, the value of the hydraulic pressure ($P_{C-1}$) of the clutch C-1 which is released during this gear shift is indicated by the broken line, and the value of the hydraulic pressure ($P_{C-2}$) of the clutch C-2 which is applied is indicated by the dotted line, but control of these hydraulic pressures is accomplished by control for special applying and releasing for which the control that is the main point of the invention differs. The initial rise in the hydraulic pressure ($P_{C-2}$) is in order to speed up the piston stroke, and the bend in the dotted line after the intersection of the two lines indicates the starting point of the inertia phase.

Figure 19:
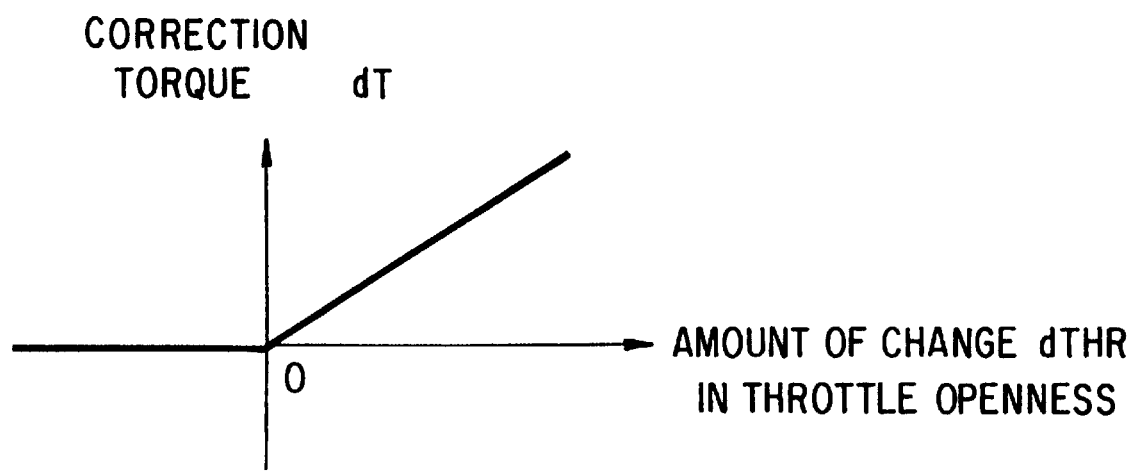
FIG. 19 is a characteristics diagram showing the data of the correction torque with respect to the amount of change in the throttle openness.
Figure 22:
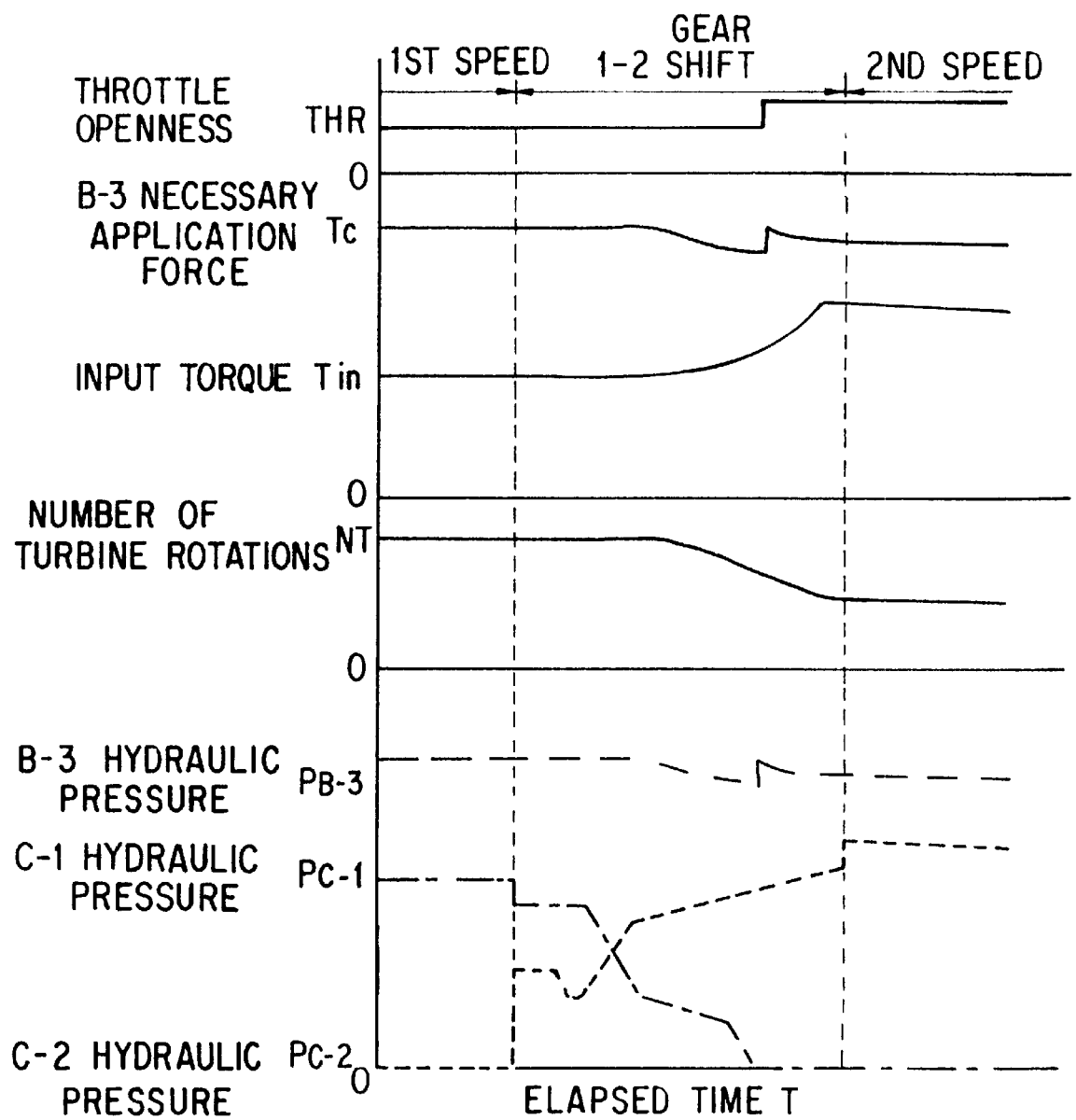
FIG. 22 is a time chart of the gear shift control when there is change in the throttle openness.

In contrast to this, FIG. 22 shows the state when there is change in the throttle openness because of the above-described gear shift control by means of a time chart for the 1→2 gear shift. As shown in the figure, when the throttle openness (THR) becomes large during the gear shift, the difference between the necessary application force (Tc) of the brake B-3 before and after the gear shift becomes smaller. The input torque (Tin) changes to a still higher value accompanying this. On the other hand, the number of turbine rotations (NT) similarly declines accompanying the shift up. When this occurs, the rate of decrease in the hydraulic pressure ($P_{B-3}$) of the brake B-3 which maintains application becomes smaller accompanying the value of the necessary application force (Tc). The input torque (Tin) when this occurs aims to prevent slipping of the friction application element by chance by the apparatus in which the hydraulic pressure ($P_{B-3}$) of the brake B-3 is caused to change simultaneously with the change in the throttle openness taking into consideration the delay in the hydraulic pressure control, and by the change in the hydraulic pressure always preceding the change in the input torque (Tin) with respect to the change of the throttle openness in the increasing direction, regardless of the fact that the input torque (Tin) is delayed until a torque change is created by the engine reacting to the change in the throttle openness. Accordingly, because it is desirable for creation of the change in the hydraulic pressure in the decreasing direction to be delayed with respect to the change in the throttle openness in the decreasing direction, the correction torque (dT) is set to 0, as shown in FIG. 19. In this case also, the value of the hydraulic pressure ($P_{C-1}$) of the clutch C-1 which is released at this gear shift is indicated by the broken line and in addition, the value of the hydraulic pressure ($P_{C-2}$) of the clutch C-2 which is applied is indicated by the dotted line at the very bottom of the figure.

Figure 10:
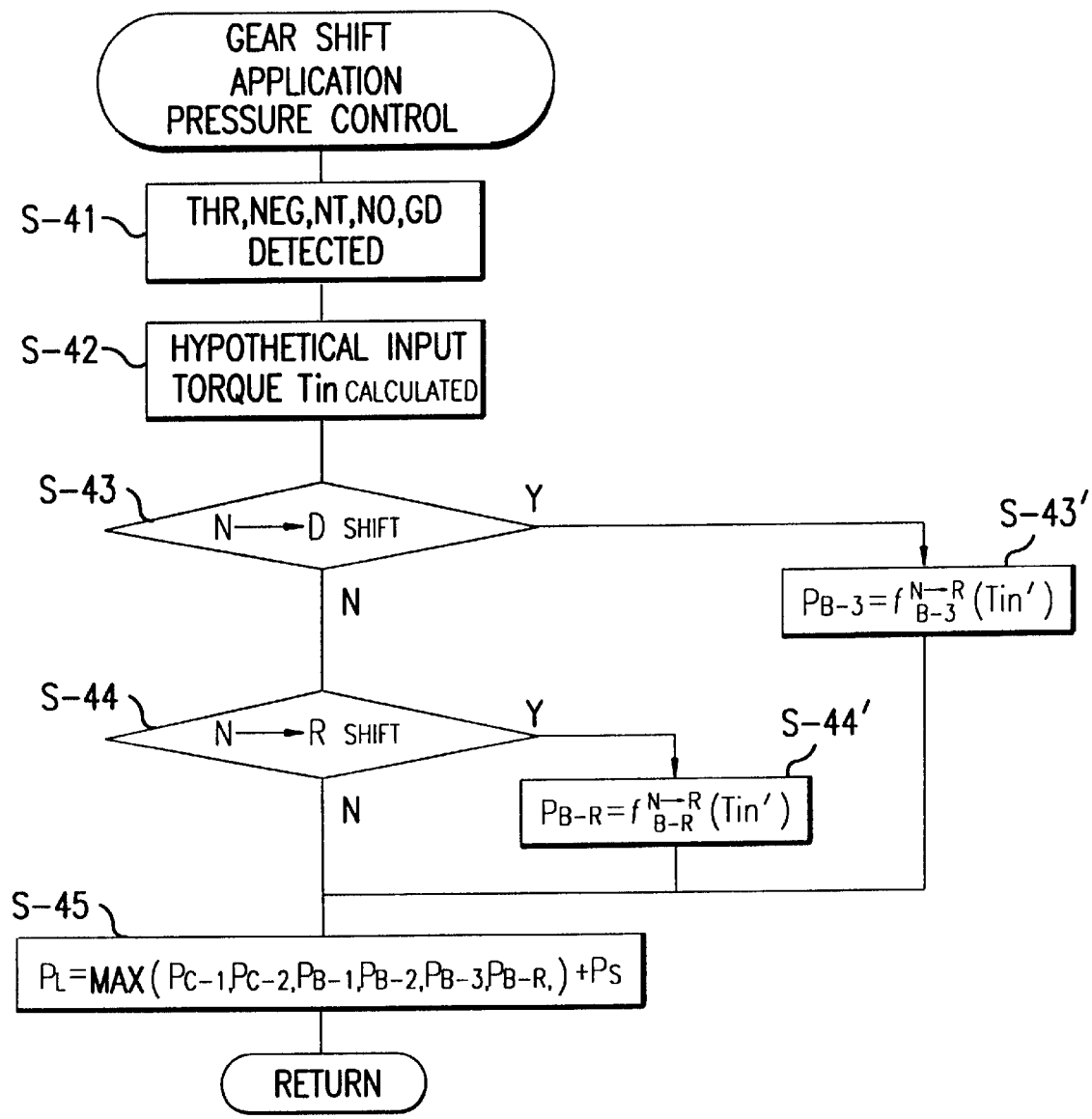
FIG. 10 is a flowchart for the garage shift application pressure control in the above-described main flowchart.
Figure 12:
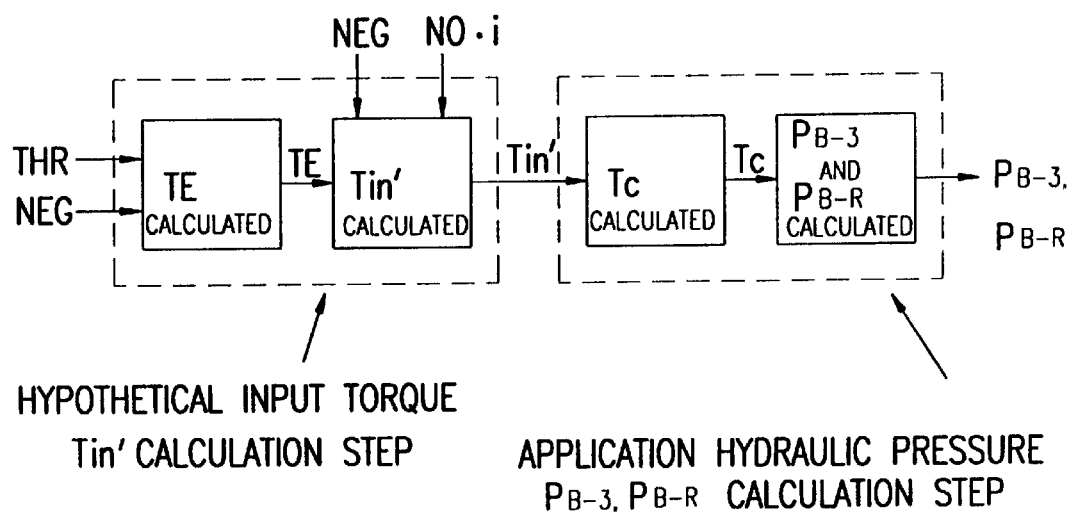
FIG. 12 is a block diagram of the application hydraulic pressure calculation and input torque calculation steps of the garage shift by the above-described control apparatus.
Figure 17:
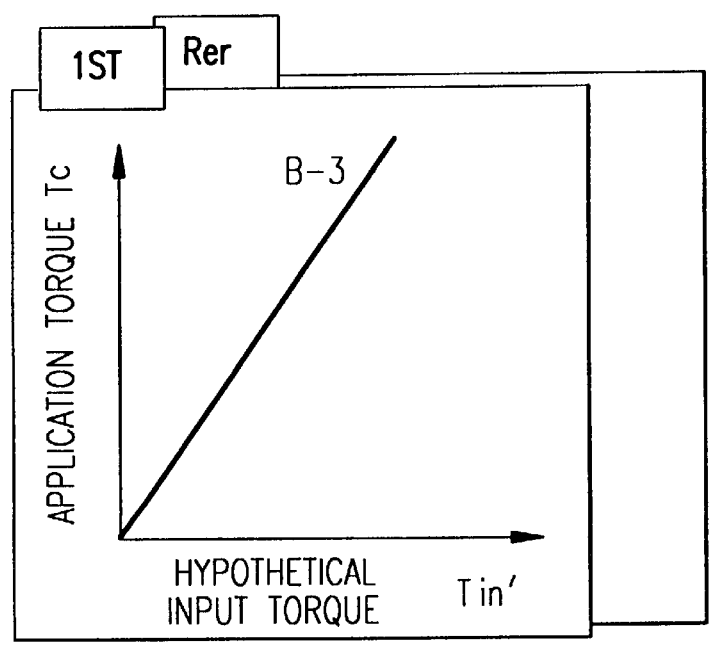
FIG. 17 is a characteristics diagram showing the data of the application torque with respect to the hypothetical input torque.

FIG. 10 shows the details of the garage shift application pressure control subroutine. In this routine, first in step S-41 the detection of the throttle openness (THR), the number of engine rotations (NEG), the number of turbine rotations (NT), the number of transmission output rotations (NO) and the gear stage (GD) is the same, but in this case, the hypothetical input torque (Tin') rather than the current input torque is calculated in step S-42 on the basis of this information. FIG. 12 shows in block form the hypothetical input torque calculation step S-42, and the application hydraulic pressure calculation steps S-43' and S-44' through the determination of the N→D shift of step S-43 or the N→R shift of step S-44 in this case. As shown in this figure, in the engine torque calculation (TE), the engine torque (TE) is calculated from the data shown in FIG. 13 using as inputs the throttle openness (THR) and the number of engine rotations (NEG). In the calculation of the next hypothetical input torque (Tin'), the speed ratio (e) when the clutch C-1 is applied is predicted from the number of engine rotations (NEG) and the product of the number of output rotations (NO) and the gear ratio (i) (the first speed gear ratio in this case), the torque ratio corresponding to this speed ratio (e) is read from the data shown in FIG. 14, and the hypothetical transmission input torque (Tin') is calculated by multiplying the torque ratio (t) and the engine torque (TE). In the calculation of the application force (Tc), the necessary application force (Tc) of the brake B-3 or the brake B-R is calculated from the data shown in FIG. 17. In the calculation of the application hydraulic pressures ($P_{B-3}$, $P_{B-R}$), the calculated application force (Tc) is changed into the application hydraulic pressures ($P_{B-3}$, $P_{B-R}$) using the data shown in FIG. 18. When this occurs, the hydraulic pressure which is set is the sum of the hydraulic pressure necessary for the piston stroke of the hydraulic servo and an allowance amount. The final step S-45 is the same as in the cases of the above-described other two controls.

Figure 23:
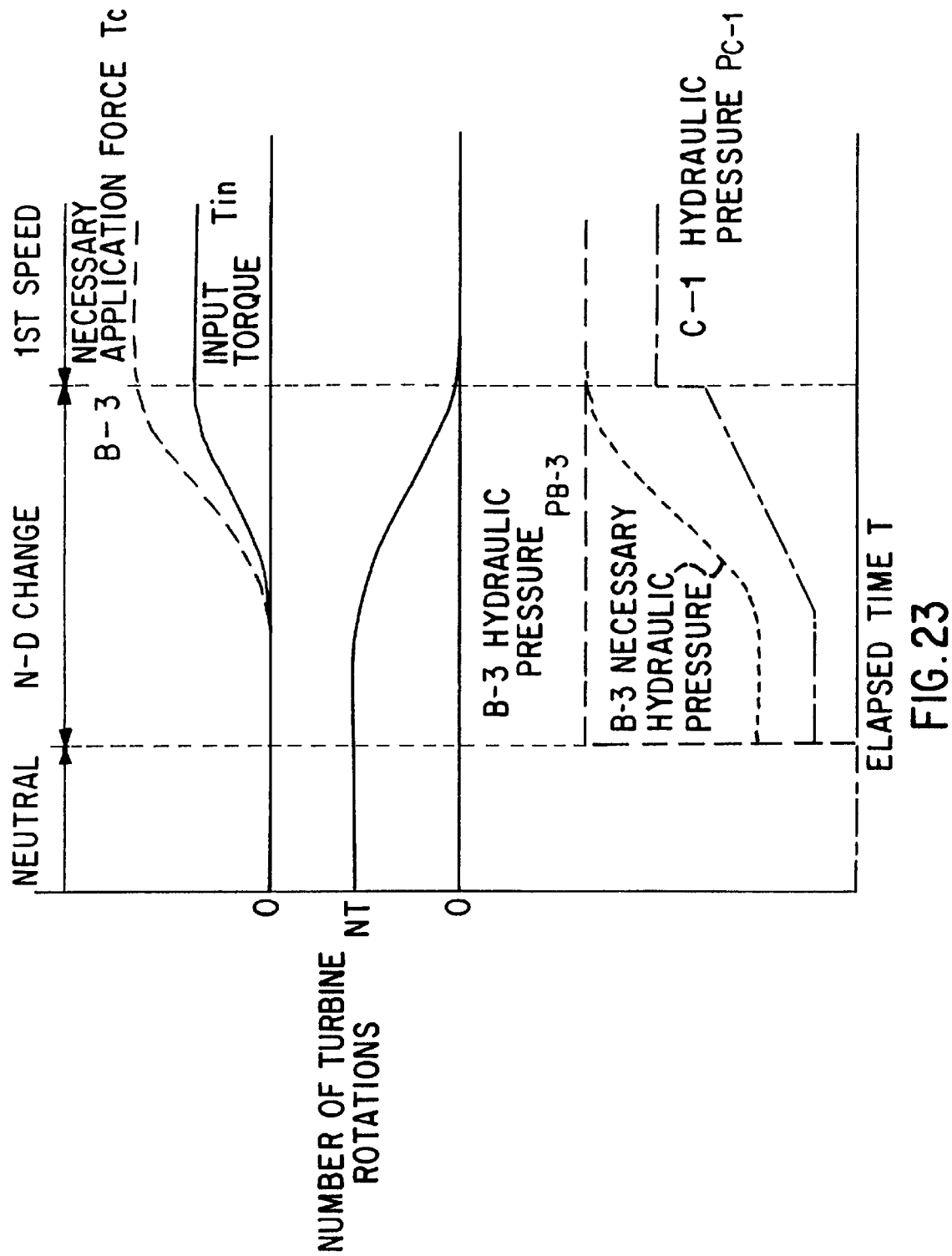
FIG. 23 is a time chart of the garage shift control.

Finally, FIG. 23 shows the time chart of control during the garage shift (N→D gear shift). In this case, as shown in the figure, the clutch C-1 is released in the original neutral state, and consequently, the number of turbine rotations (NT) is a low value substantially equal to idling or a number of engine rotations close to this. Furthermore, when the N→D shift is detected, rising pressure control of the clutch C-1 hydraulic pressure ($P_{C-1}$) is effected through control separate from the control of the invention, and this hydraulic pressure rises as indicated by the broken line in the drawing. Through the progress of the application of the clutch C-1 in conjunction with this hydraulic pressure supply, the necessary application force (Tc) of the brake B-3 also rises, and consequently the hydraulic pressure necessary for application of the brake B-3 also rises in theory as indicated by the dotted line in the figure, but in this low rotation range, detecting this with high precision from these detected values is in actuality impossible because of the limits to the detection precision of the sensors which detect the number of engine rotations and the number of turbine rotations, and consequently in accordance with the invention, the hydraulic pressure ($P_{B-3}$) of the brake B-3 is made a value corresponding to the necessary application force (Tc) after the application of the brake B-3 of first speed simultaneously with the gear shift determination, as indicated by the dashed line. This kind of control, taken alone, appears to be unsuitable for the main point of the invention, but this transitional state corresponds to an extremely short period of time if taken as a percentage of the application of the brake B-3 as a whole in driving the vehicle, and hence does not impair the efficacy of the invention. The input torque (Tin) rises to the value of first speed in accordance with the throttle openness in conjunction with the torque transfer of the clutch C-1, and the number of turbine rotations (NT) becomes the value 0 of the stall state when the engine starts because this number is mechanically linked to the wheel side of the vehicle in conjunction with the application of the clutch C-1.

As described in detail above, with the control apparatus of the above-described embodiment, during normal times, hydraulic pressure in accordance with the input torque is detected and supplied to each friction application element; during gear shifts, retention pressure through the change in the throttle openness and the torque load of each friction application element is supplied; and during garage shifts, it is possible to perform hydraulic pressure supply by detecting the retention hydraulic pressure which assumes the stall state of the torque converter. Consequently, it is possible to reduce greater than necessary rising of the surface pressure during application of the friction materials of the friction applications elements, and through this it is possible to reduce the load repeatedly applied through application and releasing, to curtail deterioration of strength, and to maintain high durability.

The invention is explained in detail above on the basis of the preferred embodiment, but the invention can be embodied by altering the specific composition of the various particular within the scope of the items noted in the claims.

What is claimed is:

1. An automatic transmission control apparatus, comprising:
    a transmission mechanism having a plurality of friction application elements which are simultaneously applied in order to maintain a predetermined gear;
    hydraulic servos which individually operate the friction application elements; and,
    supply means which supply hydraulic pressure to the hydraulic servos in order to operate each of the friction application elements;
    information detecting means which detects information relating to a functioning of the transmission mechanism;
    input torque calculating means which calculates an input torque of the transmission mechanism on the basis of the functioning information which is detected; and,
    application hydraulic pressure calculating means which calculates a necessary application hydraulic pressure needed to maintain application of the individual friction application elements based on the calculated input torque;
    wherein the hydraulic pressure supplied to the various hydraulic servos by the supply means is the necessary application hydraulic pressure calculated for each friction application element in order to maintain the predetermined gear.

2. The automatic transmission control apparatus of claim 1, wherein at least one of the friction application elements, out of the plurality of friction application elements, maintains application through a gear shift to the designated gear, the information detecting means detects a progress state of the gear shift of the transmission mechanism, and the application hydraulic pressure calculating means causes the necessary application hydraulic pressure to change in accordance with the detected progress state.

3. The automatic transmission control apparatus of claim 2, wherein the information detecting means has an input rotation detecting means that detects a number of input rotations of the transmission mechanism and an output rotation detecting means which detects a number of output rotations; and,
    the progress state is detected by the change in gear ratio during the gear shift of the number of input rotations and the number of output rotations which are detected, and the application hydraulic pressure calculating means causes the necessary application hydraulic pressure to change in accordance with the change in gear ratio.

4. The automatic transmission control apparatus of claim 2, wherein the information detecting means has a throttle openness detecting means which detects openness of an engine throttle; and,
    the application hydraulic pressure calculating means calculates the necessary application hydraulic pressure by adding a correction torque set in accordance with a change in throttle openness separate from the input torque calculated by the input torque calculating means, when throttle openness changes during a gear shift.

5. The automatic transmission control apparatus of claims 1, wherein:
    an automatic transmission equipped with a torque converter which transfers engine torque to the transmission mechanism;
    the information detecting means has an engine rotation detecting means which detects a number of rotations of an engine, a throttle openness detecting means which detects an openness of the engine throttle, and a turbine rotation detecting means which detects a number of turbine rotations of the torque converter; and,
    the input torque calculating means detects engine torque from throttle openness and number of engine rotations which have been detected, and changes calculated engine torque to input torque through a torque ratio from the number of engine rotations and the number of turbine rotations, the torque ratio obtained on a basis of a number of input and output rotations of the torque converter.

6. The automatic transmission control apparatus of claim 1, wherein when the designated gear is achieved from a state in which engine torque is not transferred to the transmission mechanism, the input torque calculating means calculates a predicted input torque by predicting input torque input into the transmission mechanism when the designated gear is achieved; and,
    the application hydraulic pressure calculating means calculates the necessary application hydraulic pressure on the basis of the predicted input torque which was calculated.

7. The automatic transmission control apparatus of claim 6, wherein:

an automatic transmission having a torque converter which transfers engine torque to the transmission mechanism;

the information detecting means has an engine rotation detecting means which detects a number of engine rotations, a throttle openness detecting means which detects openness of the engine throttle, and an output rotation detecting means which detects a number of output rotations of the transmission mechanism; and, the input torque calculating means calculates engine torque from the detected throttle openness and the detected number of engine rotations, and converts the calculated engine torque into the predicted input torque by predicting a number of output rotations of the torque converter from the detected number of output rotations and a gear ratio after the designated gear is achieved, and from a torque ratio obtained based on a number of input rotations of the torque converter from the detected number of engine rotations and the predicted number of output rotations.

\* \* \* \* \*